US012328593B2

(12) United States Patent
Sharma Banjade et al.

(10) Patent No.: US 12,328,593 B2
(45) Date of Patent: Jun. 10, 2025

(54) UNLICENSED SPECTRUM HARVESTING WITH COLLABORATIVE SPECTRUM SENSING IN NEXT GENERATION NETWORKS

(71) Applicant: Intel Corporation, Santa Clara, CA (US)

(72) Inventors: Vesh Raj Sharma Banjade, Portland, OR (US); S M Iftekharul Alam, Hillsboro, OR (US); Kuilin Clark Chen, Portland, OR (US); Kshitij Arun Doshi, Tempe, AZ (US); Francesc Guim Bernat, Barcelona (ES); Christian Maciocco, Portland, OR (US); Ned M. Smith, Beaverton, OR (US); Liuyang Lily Yang, Portland, OR (US); Satish Chandra Jha, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 17/482,773

(22) Filed: Sep. 23, 2021

(65) Prior Publication Data

US 2023/0086899 A1 Mar. 23, 2023

(51) Int. Cl.
*H04W 16/14* (2009.01)
*H04B 15/00* (2006.01)
(Continued)

(52) U.S. Cl.
CPC ............ *H04W 16/14* (2013.01); *G06N 20/00* (2019.01)

(58) Field of Classification Search
None
See application file for complete search history.

(56) References Cited

U.S. PATENT DOCUMENTS 8,532,686 B2 * 9/2013 Schmidt ................ H04L 5/0089
370/332
8,576,817 B2 * 11/2013 Stanforth .............. H04W 16/14
370/338

(Continued)

FOREIGN PATENT DOCUMENTS

CN     115882981     3/2023
EP      4156745     10/2024

OTHER PUBLICATIONS

"Global Update on spectrum for 4G and 5G", [Online]. Retrieved from the Internet: URL: https: www.qualcomm.com media documents files spectrum-for-4g-and-5g.pdf, (Dec. 2020), 20 pgs.

(Continued)

*Primary Examiner* — Tuan A Tran
(74) *Attorney, Agent, or Firm* — Schwegman Lundberg & Woessner, P.A.

(57) ABSTRACT

A computing node includes interface circuitry and processing circuitry. To implement a spectrum harvesting entity in a wireless network configured for crowdsource-based unlicensed spectrum harvesting, the processing circuitry is configured to select a set of crowdsourcing nodes from a plurality of crowdsourcing nodes available in the wireless network. A plurality of spectrum occupancy reports (SORs) is received from the set of crowdsourcing. Each of the plurality of SORs indicates a channel occupancy status of a communication channel in the unlicensed spectrum sensed by a corresponding crowdsourcing node of the set and geolocation associated with the corresponding crowdsourcing node. A spectrum occupancy map of the unlicensed spectrum is generated based on the channel occupancy status and the geolocation provided in the plurality of SORs by each crowdsourcing node of the set of crowdsourcing nodes.

20 Claims, 15 Drawing Sheets

(51) Int. Cl.
  *H04L 12/28*   (2006.01)
  *H04W 74/00*   (2009.01)
  *G06N 20/00*   (2019.01)

(56) References Cited

U.S. PATENT DOCUMENTS

| | | | | |
|---|---|---|---|---|
| 8,830,863 | B2* | 9/2014 | Novak | H04W 72/542 |
| | | | | 370/252 |
| 8,983,483 | B2* | 3/2015 | Lee | H04W 72/541 |
| | | | | 370/329 |
| 8,983,514 | B2* | 3/2015 | Lee | H04W 48/08 |
| | | | | 455/511 |
| 9,066,371 | B2* | 6/2015 | Lee | H04W 84/12 |
| 9,078,196 | B2* | 7/2015 | Kim | H04W 16/14 |
| 9,113,341 | B2* | 8/2015 | Kim | H04W 52/367 |
| 9,118,450 | B2* | 8/2015 | Kim | H04W 72/0453 |
| 9,185,707 | B2* | 11/2015 | Lee | H04W 72/0453 |
| 9,247,544 | B2* | 1/2016 | Kim | H04W 72/0453 |
| 9,380,589 | B2* | 6/2016 | Lee | H04W 72/1215 |
| 9,386,459 | B2* | 7/2016 | Stanforth | H04W 16/14 |
| 9,439,186 | B2* | 9/2016 | Lee | H04Q 4/02 |
| 9,491,661 | B2* | 11/2016 | Elrefaey | G06Q 30/08 |
| 9,544,839 | B2* | 1/2017 | Kim | H04W 48/16 |
| 9,648,383 | B2* | 5/2017 | Kim | H04N 21/4383 |
| 9,681,424 | B2* | 6/2017 | Kim | H04W 72/04 |
| 9,756,655 | B2* | 9/2017 | Kim | H04W 8/005 |
| 9,867,058 | B2* | 1/2018 | Tudose | H04W 64/003 |
| 9,985,810 | B2* | 5/2018 | Carbajal | H04W 72/0446 |
| 9,998,243 | B2* | 6/2018 | Garcia | H04B 17/27 |
| 11,497,054 | B2* | 11/2022 | Deogun | H04W 74/0808 |
| 2012/0185429 | A1* | 7/2012 | Shu | H04W 24/08 |
| | | | | 707/609 |
| 2012/0208558 | A1* | 8/2012 | Bajko | H04W 72/23 |
| | | | | 455/456.1 |
| 2013/0035108 | A1* | 2/2013 | Joslyn | H04W 24/08 |
| | | | | 455/454 |
| 2015/0126207 | A1* | 5/2015 | Li | H04W 16/14 |
| | | | | 455/452.1 |
| 2018/0213407 | A1* | 7/2018 | Miao | H04W 16/10 |
| 2022/0095176 | A1* | 3/2022 | Lim | H04W 36/0058 |

OTHER PUBLICATIONS

Das, A, "Q-learning based cooperative spectrum mobility in cognitive radio networks", IEEE 42nd Conference on Local Computer Networks, (2017), pp. 502-505.

Ning, W, "Reinforcement Learning Based Cooperative Spectrum Sensing in", IoT As a Service, (2019).

"European Application Serial No. 22188476.0, Response filed Sep. 22, 2023 to Extended European Search Report mailed Jan. 23, 2023", 75 pgs.

"European Application Serial No. 22188476.0, Extended European Search Report mailed Jan. 23, 23", 7 pgs.

Curran, Max, "ProCSA: Protecting Privacy in Crowdsourced Spectrum Allocation", Advances in Databases and Information Systems; [Lecture Notes in Computer Science; Lect. Notes Computer], Springer International Publishing, Cham, (Sep. 15, 2019), 556-576.

Qiu, Xinyu, "Cost-Minimized Crowdsourced Spectrum Sensing", IEEE Access, vol. 7, 154640-154648.

Kiaohui, Li, "Privacy-Aware Crowdsourced Spectrum Sensing and Multi-User Sharing Mechanism in Dynamic Spectrum Access Networks", IEEE Access, vol. 7, 32971-32988.

* cited by examiner

UNLICENSED SPECTRUM HARVESTING WITH COLLABORATIVE SPECTRUM SENSING IN NEXT GENERATION NETWORKS

TECHNICAL HUD

Aspects pertain to wireless communications including edge computing. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for configuring unlicensed spectrum harvesting with collaborative spectrum sensing for survivability of next generation networks under failure or disaster.

BACKGROUND

Mobile communications and edge computing have evolved significantly from early voice systems to today's highly sophisticated integrated communication platform. With the increase in different types of devices communicating with various network devices, usage of 3GPP LTE systems has increased. The penetration of mobile devices (user equipment or UEs) in modem society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Edge computing, at a general level, refers to the implementation, coordination, and use of computing and resources at locations closer to the "edge" or collection of "edges" of the network. The purpose of this arrangement is to reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use cases that are projected to extensively utilize edge computing include connected self-driving cars, surveillance, Internet of Things (IoT) device data analytics, video encoding and analytics, location-aware services, device sensing in Smart Cities, among many other networks, and compute-intensive services.

Edge computing may, in some scenarios, offer node management services with orchestration and management for applications and coordinated service instances among many types of storage and compute resources. Edge computing is also expected to be closely integrated with existing use cases and technology developed for IoT and Fog/distributed networking configurations including node configuration tuning, as endpoint devices, clients, and gateways attempt to access network resources and applications at locations closer to the edge of the network while optimally utilizing network resources. Edge computing can also be used to help enhance communication between user devices or between IoT devices using licensed or unlicensed spectrum. Potential radio access network (RAN) and edge computing operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum. Further enhanced operation of wireless systems in the licensed, as well as unlicensed spectrum, is expected in future releases and 5G (and beyond) wireless systems. Such enhanced operations can include techniques for unlicensed spectrum harvesting with collaborative spectrum sensing for survivability of next generation networks under failure or disaster.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following embodiments generally relate to unlicensed spectrum harvesting with collaborative spectrum sensing for survivability of next generation networks under failure or disaster. The disclosed techniques may use spectrum harvesting functions (SHF) to facilitate unlicensed spectrum harvesting in wireless networks. Example embodiments can be implemented in systems similar to those shown in any of the systems described below in reference to FIGS. 1-9C. Additional description of the SHF and various network entities using the SHF is provided herein below in connection with at least FIG. 10-FIG. 13.

Figure 1:
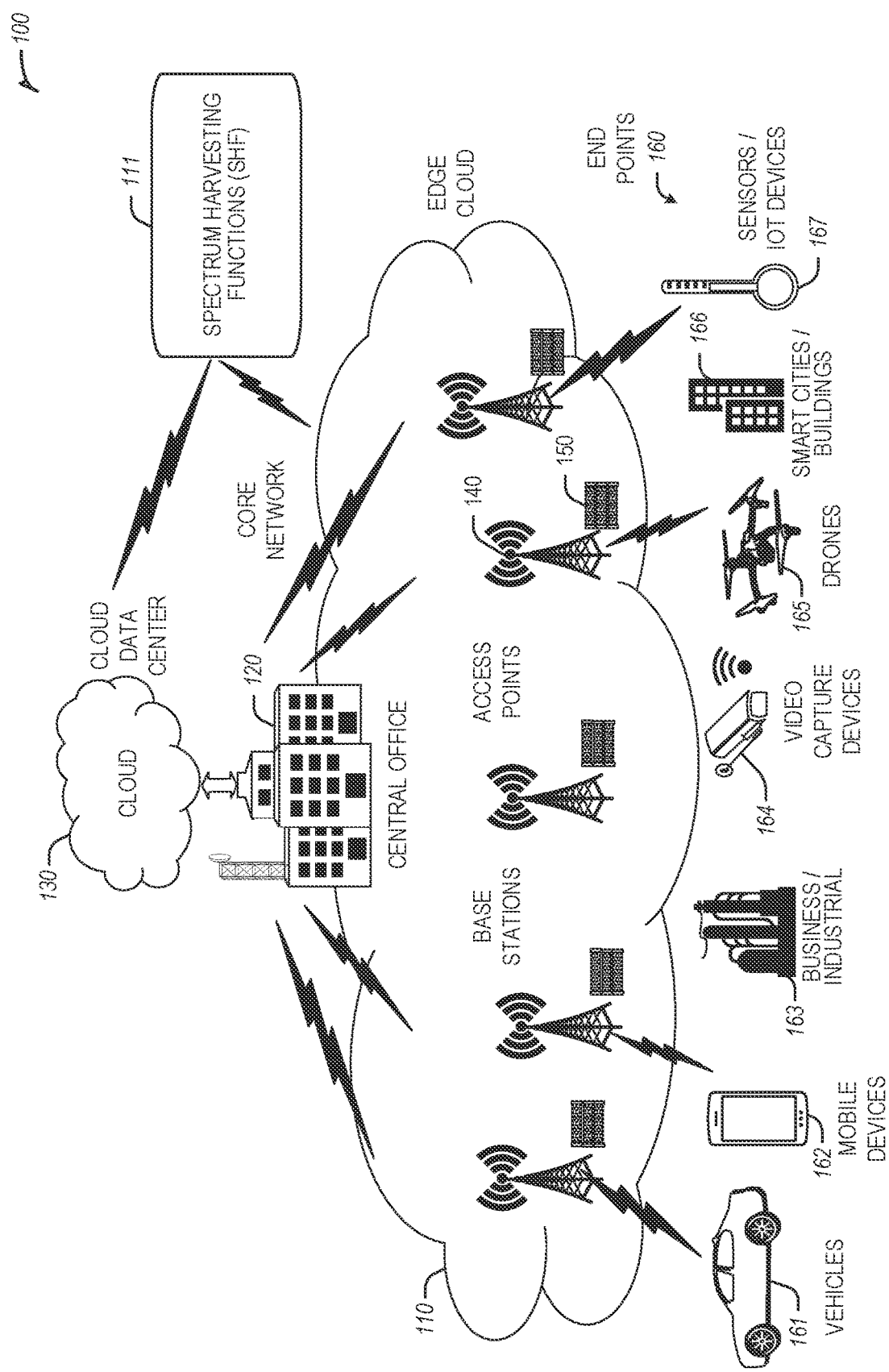
FIG. 1 illustrates an overview of an edge cloud configuration for edge computing using spectrum harvesting functions (SHF)

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power are often constrained. Thus, edge computing attempts to reduce the number of resources needed tier network services, through the distribution of more resources that are located closer to both geographically and in-network access time. In this manner, edge computing attempts to bring the compute resources to the workload data where appropriate or bring the workload data to the compute resources.

The following describes aspects of an edge cloud architecture that covers multiple potential deployments and addresses restrictions that some network operators or service providers may have in their infrastructures. These include a variety of configurations based on the edge location (because edges at a base station level, for instance, may have more constrained performance and capabilities in a multitenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use cases (e.g., autonomous driving or video surveillance) for connected client devices. As an example, base stations may be augmented with compute and acceleration resources to directly process service workloads for the connected user equipment, without further communicating data via backhaul networks. As another example, central office network management hardware may be replaced with standardized compute hardware that performs virtualized network functions and offers compute resources for the execution of services and consumer functions for connected devices. Within edge computing networks, there may be scenarios in services in which the compute resource will be "moved" to the data, as well as scenarios in which the data will be "moved" to the compute resource. As an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In some aspects, the edge cloud 110 and the cloud data center 130 can be configured with spectrum harvesting functions (SHF) 111. Example SHF include using unlicensed spectrum harvesting for providing additional spectral capacity at-hand (for mobile network operators or MNOs, for instance) via opportunistic occupancy map building at single and multi (inter)-operator (collaborative in case of multi-operator) in a dynamic manner for preparedness against Failure-Attack-Fault-Outage (FAFO) and other disaster events. Additional description of the SHF is provided herein below in connection with, e.g. FIGS. 10-13.

Figure 2:
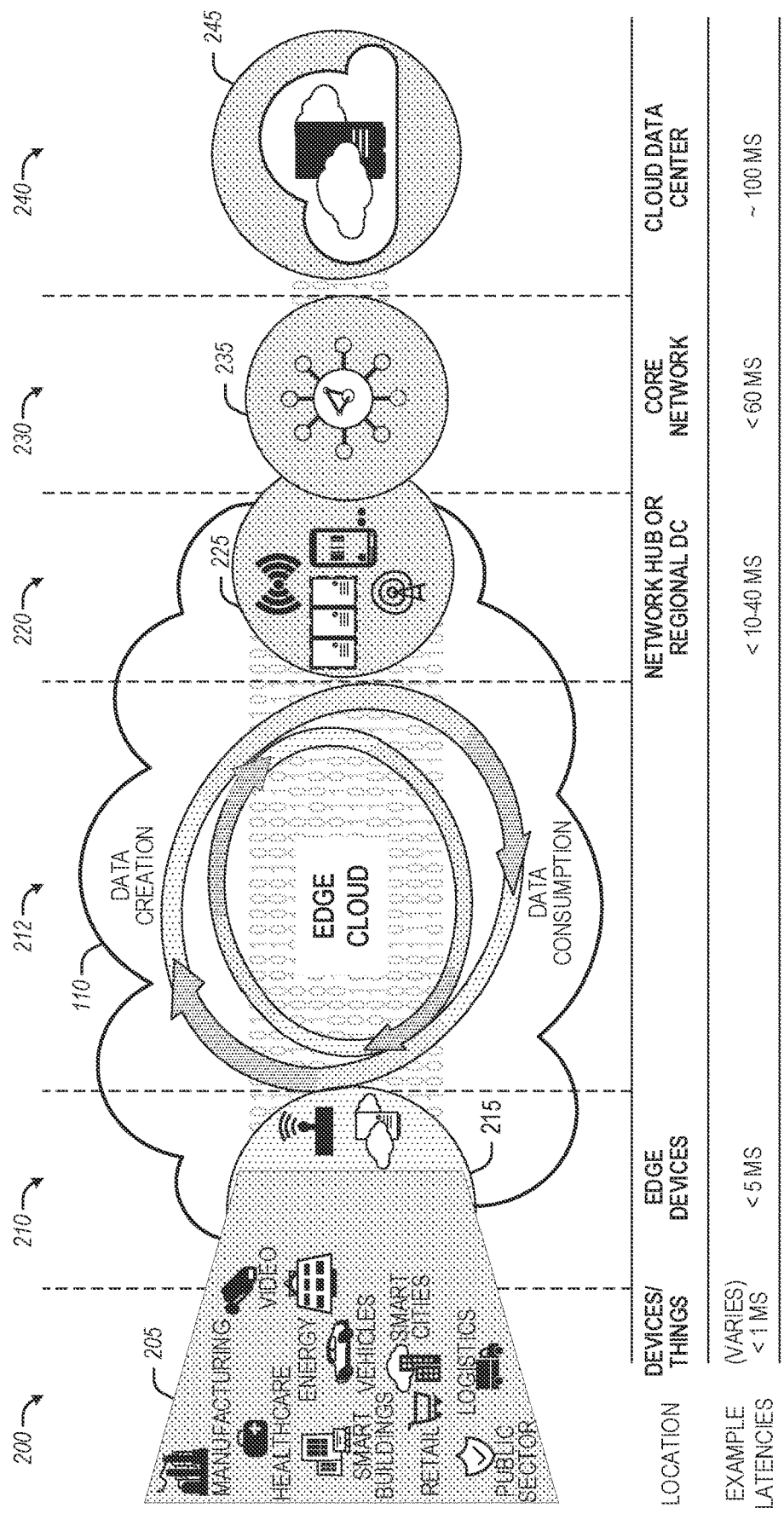
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted. Any of the communication use cases 205 can be configured with SHF 111, which may be (1) performed by a communication node configured as an orchestration management entity (e.g., a harvesting node or harvester) within a MEC network (e.g., the orchestration management entity using the SHF for spectrum harvesting with collaborative spectrum sensing), or (2) performed by a board management controller (BMC) of a computing node (e.g., for automated node configuration tuning of the same computing node).

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network layer 230 and cloud data center layer 240, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies, in some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, a number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of (a) Priority (throughput or latency; also referred to as service level objective or SLO) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, whereas some other input streams may tolerate an occasional failure, depending on the application); and (c) Physical constraints (e.g., power, cooling, and form-factor).

The end-to-end service view for these use cases involves the concept of a service flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real-time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing come the following caveats. The devices located at the edge are often resource-constrained and therefore there is pressure on the usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permission access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from the client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, the cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or another thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources that are proximately located to radio access network (RAN) capable endpoint devices (e.g., mobile computing devices, IoT devices, smart devices, etc.), which are discussed herein. In other words, the edge cloud 110 may be envisioned as an "edge" that connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing device. For example, the edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect the contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein, and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent of other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 9A-9C. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code, or scripts may execute while being isolated from one or more other applications, software, code, or scripts.

Figure 3:
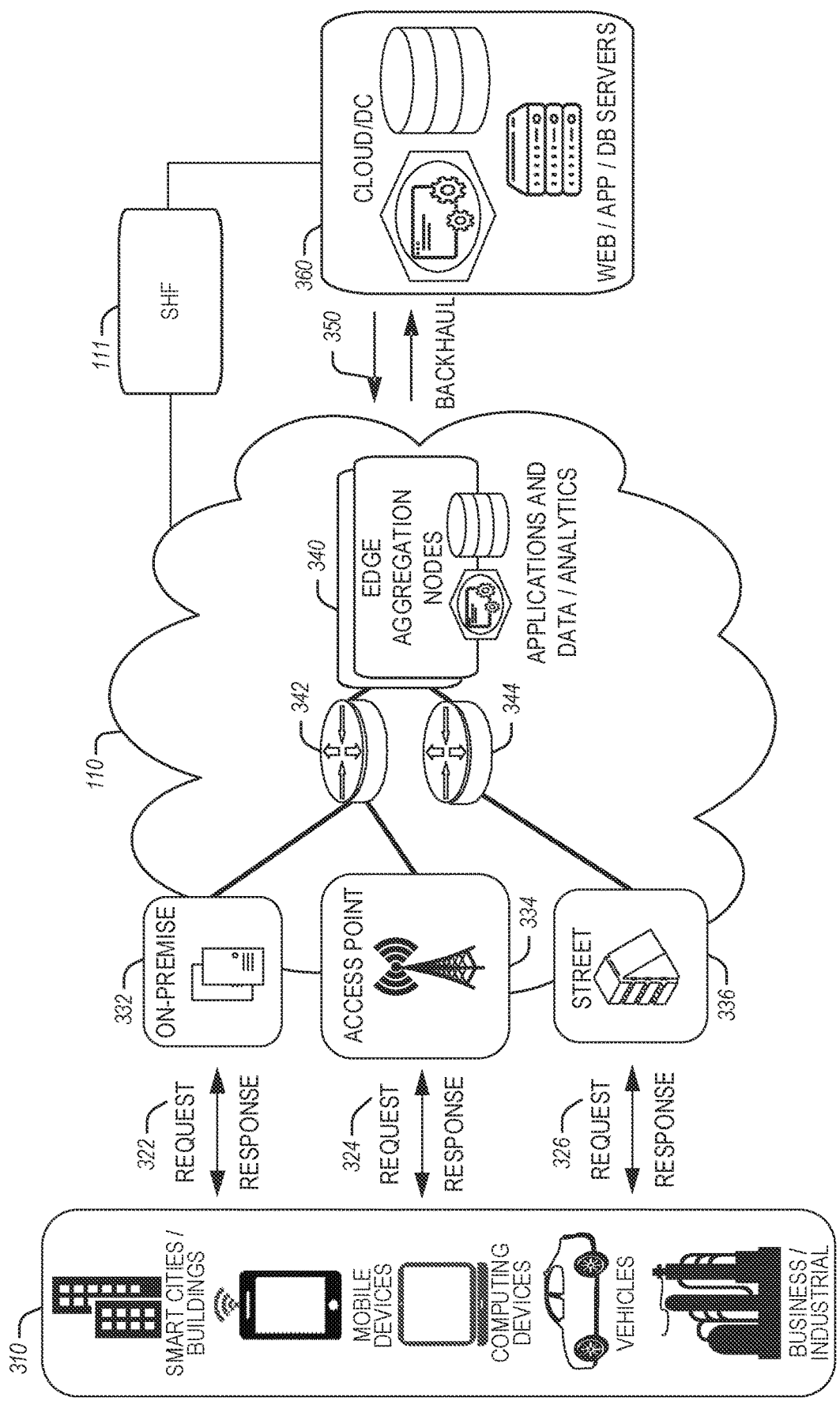
FIG. 3 illustrates an example approach for networking and services in an edge computing system using the SHF.

In FIG. 3, various client endpoints 310 (in the form of mobile devices, computers, autonomous vehicles, business computing equipment, industrial processing equipment) exchange requests and responses that are specific to the type of endpoint network aggregation, For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

In an example embodiment, the edge cloud 110 and the cloud or data center 360 utilize SHF 111 in connection with disclosed techniques. The SHF 111 may be (1) performed by a communication node configured as an orchestration management entity (e.g., a harvesting node or harvester) within a MEC network (e.g., the orchestration management entity using the SHF for spectrum harvesting with collaborative spectrum sensing), or (2) performed by a board management controller (BMC) of a computing node (e.g., for automated node configuration tuning of the same computing node), as discussed in connection with FIG. 10-FIG. 12.

Figure 4:
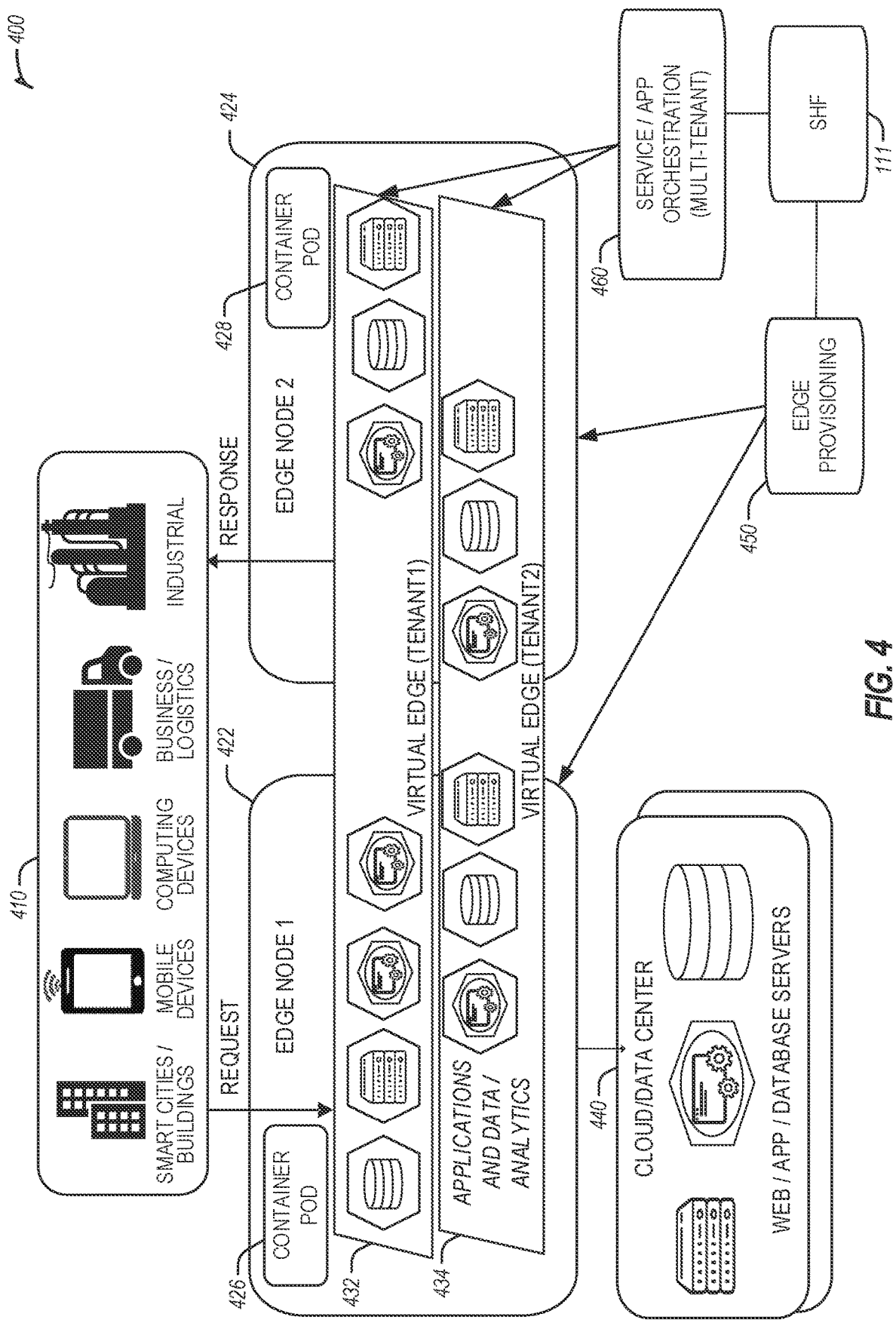
FIG. 4 illustrates deployment of a virtual edge configuration in an edge computing system with an SHF operated among multiple edge nodes and multiple tenants.

FIG. 4 illustrates deployment and orchestration for virtual edge configurations across an edge computing system operated among multiple edge nodes and multiple tenants. Specifically, FIG. 4 depicts the coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 (or virtual edges) provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers the first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

In an example embodiment, the edge provisioning functions 450 and the orchestration functions 460 can utilize SHF 111 in connection with disclosed techniques. The SHF 111 may be (1) performed by a communication node configured as an orchestration management entity (e.g., a harvesting node or harvester) within a MEC network (e.g., the orchestration management entity using the SHF for spectrum harvesting with collaborative spectrum sensing), or (2) performed by a board management controller (BMC) of a computing node (e.g., for automated node configuration tuning of the same computing node), as discussed in connection with FIG. 10-FIG. 12.

It should be understood that some of the devices in the various client endpoints 410 are multi-tenant devices where Tenant 1 may function within a tenant1 'slice' while Tenant 2 may function within a tenant2 slice and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant-specific RoT. An RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in virtual edge instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshaling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain an RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support an RoT context for each. Accordingly, the respective RoTs spanning devices in 410, 422, and 440 may coordinate the establishment of a distributed trusted computing base (DTCB) such that a tenant-specific virtual trusted secure channel linking all elements end to end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container-specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency-sensitive applications; latency-critical applications; user plane applications; networking applications; etc). The virtual edge instances may also be spanned across systems of multiple owners at different geographic locations (or respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 432, 434 are partitioned according to the needs of each container.

With the use of container pods. a pod controller oversees the partitioning and allocation of containers and resources. The pod controller receives instructions from an orchestrator (e.g., performing orchestration functions 460) that instructs the controller on how best to partition physical resources and for what duration, such as by receiving key performance indicator (KPI) targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents the assignment of resources until the right tenant authenticates or prevents provisioning of data or a workload to a container until an attestation result is satisfied.

Also, with the use of container pods, tenant boundaries can still exist but in the context of each pod of containers. If each tenant-specific pod has a tenant-specific pod controller, there will be a shared pod controller that consolidates resource allocation requests to avoid typical resource starvation situations. Further controls may be provided to ensure the attestation and trustworthiness of the pod and pod controller. For instance, the orchestration functions 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked before the second pod executing.

Figure 5:
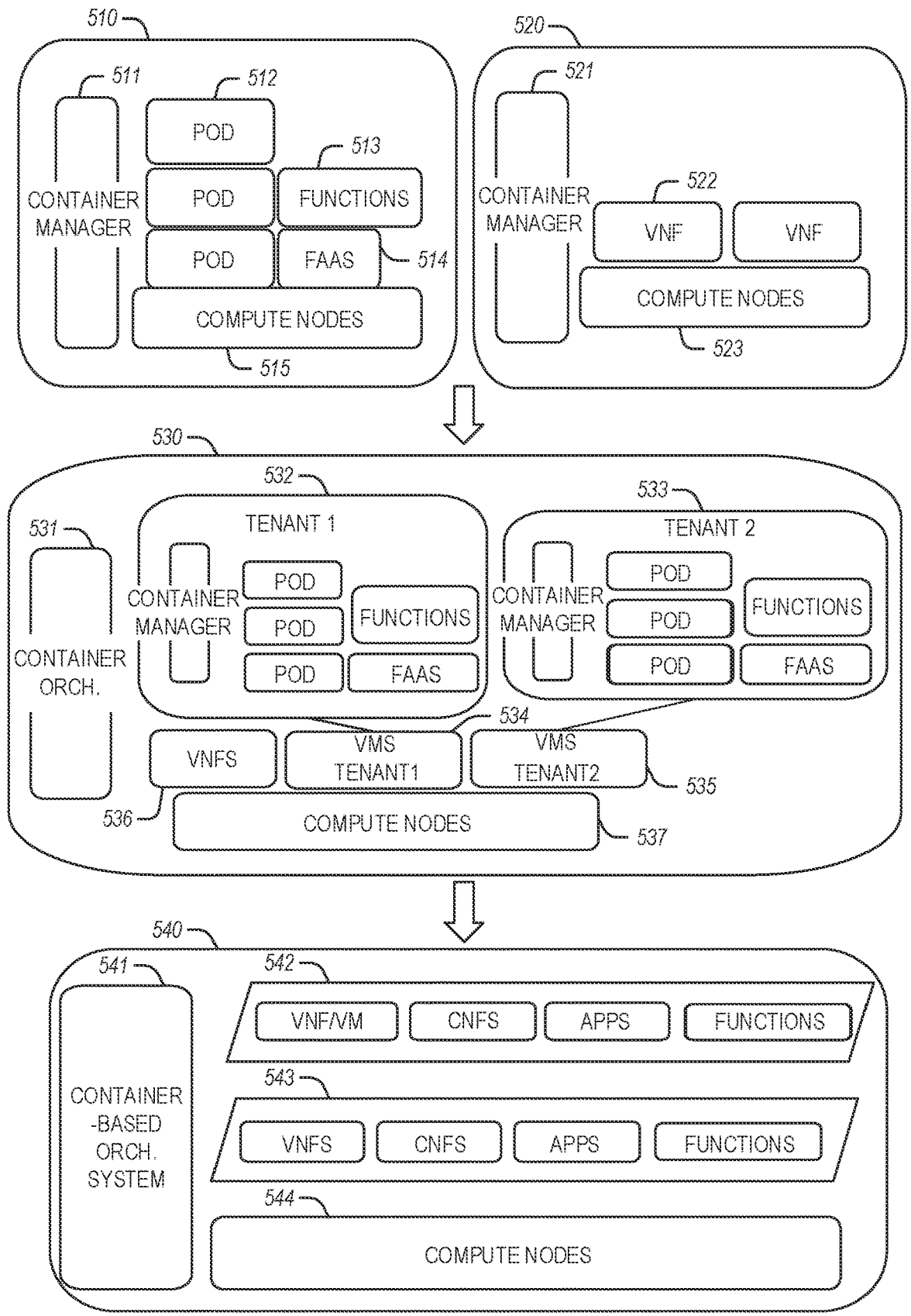
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (e.g., compute nodes 515 in arrangement 510) or to separately execute containerized virtualized network functions through execution via compute nodes (e.g., compute nodes 523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside from the execution of virtualized network functions). This arrangement is further adapted for use in system arrangement 540, which provides containers 542, 543, or execution of the various functions, applications, and functions on compute nodes 544, as coordinated by a container-based orchestration system 541.

The system arrangements depicted in FIG. 5 provide an architecture that treats VMs, Containers, and Functions equally in terms of application composition (and resulting applications are combinations of these three ingredients). Each ingredient may involve the use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include bare metal (dedicated) equipment, virtual machines, containers, virtual machines on containers, or combinations thereof.

In further examples, aspects of software-defined or controlled silicon hardware, and other configurable hardware, may integrate with the applications, functions, and services of an edge computing system. Software-defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
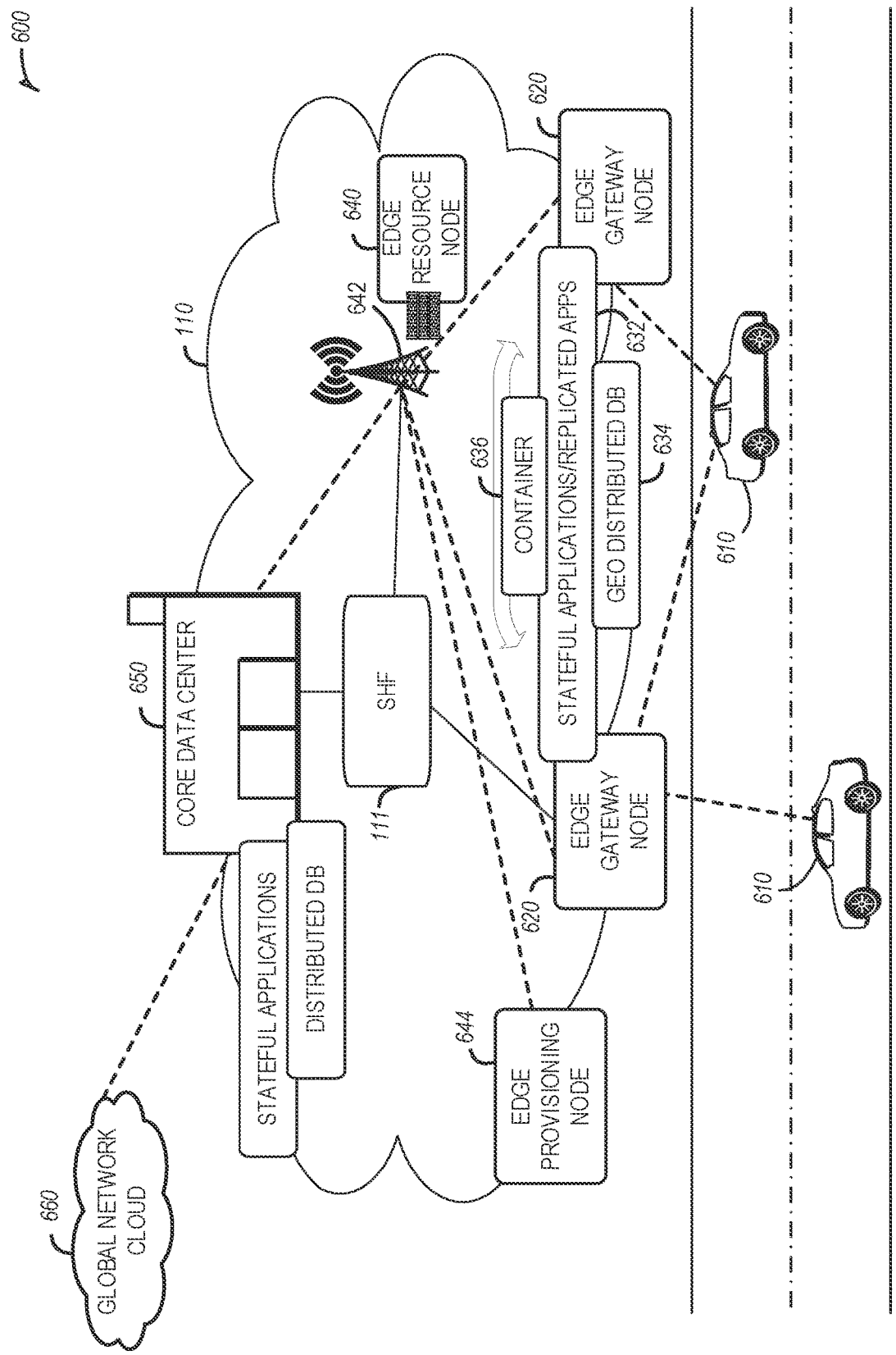
FIG. 6 illustrates a compute and communication use case involving mobile access to applications in an edge computing system using the SHF.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes (or devices) 610 may be embodied as in-vehicle compute systems (e.g., in-vehicle navigation and/or infotainment systems) located in corresponding vehicles that communicate with the edge gateway nodes (or devices) 620 during traversal of a roadway. For instance, the edge gateway nodes 620 may be located in a roadside cabinet or other enclosure built into a structure having other, separate, mechanical utility, which may be placed along the roadway, at intersections of the roadway, or other locations near the roadway. As respective vehicles traverse along the roadway, the connection between its client compute node 610 and a particular edge gateway node 620 may propagate to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway nodes 620 include an amount of processing and storage capabilities and, as such, some processing and/or storage of data for the client compute nodes 610 may be performed on one or more of the edge gateway nodes 620.

The edge gateway nodes 620 may communicate with one or more edge resource nodes 640, which are illustratively embodied as compute servers, appliances, or components located at or in a communication base station 642 (e.g., a base station of a cellular network). As discussed above, the respective edge resource nodes 640 include an amount of processing and storage capabilities, and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway nodes 620 (depending on, for example, the capabilities of each component, or information in the request indicating urgency or importance). Based on data access, data location, or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicates with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway nodes 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, a prediction can be made to identify the next owner to continue, or when the data or computational access will no longer be viable. These and other services may be utilized to complete the work that is needed to keep the transaction compliant and lossless.

In further scenarios, a container 636 (or a pod of containers) may be flexibly migrated from an edge gateway node 620 to other edge nodes (e.g., 620, 640, etc.) such that the container with an application and workload does not need to be reconstituted, re-compiled, re-interpreted for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container-native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In an example embodiment, the edge cloud 110 in FIG. 6 utilizes SHF 111 in connection with disclosed techniques. The SHF 111 may be (1) performed by a communication node configured as an orchestration management entity (e.g., a harvesting node or harvester) within a MEC network (e.g., the orchestration management entity using the SHF for spectrum harvesting with collaborative spectrum sensing), or (2) performed by a board management controller (BMC) of a computing node (e.g., for automated node configuration tuning of the same computing node), as discussed in connection with FIG. 10-FIG. 12.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application that may be provided by a third party) is executed. The container may be any isolated execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer-readable (also referred to as machine-readable) instructions 982 of FIG. 9B, to various receiving parties for implementing any of the methods described herein. The example edge provisioning node 644 may be implemented by any computer server, home server, content delivery network, virtual server, software distribution system, central facility, storage device, storage disks, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party (or parties). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer-readable instructions 982 (also referred to as machine-readable instructions 982) of FIG. 9B. The receiving parties may be consumers, service providers, users, retailers, OEMs, etc., who purchase and/or license the software instructions for use and/or re-sale and/or sub-licensing.

In an example, the edge provisioning node 644 includes one or more servers and one or more storage devices/disks. The storage devices and/or storage disks host computer-readable instructions such as the example computer-readable instructions 982 of FIG. 9B, as described below. Similar to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer-readable instructions 982 from the edge provisioning node 644. For example, the software instructions, which may correspond to the example computer-readable instructions 982 of FIG. 9B may be downloaded to the example processor platform/s, which is to execute the computer-readable instructions 982 to implement the methods described herein.

In some examples, the processor platform(s) that execute the computer-readable instructions 982 can be physically located in different geographic locations, legal jurisdictions, etc. In some examples, one or more servers of the edge provisioning node 644 periodically offer, transmit, and/or force updates to the software instructions (e.g., the example computer-readable instructions 982 of FIG. 9B) to ensure improvements, patches, updates, etc. are distributed and applied to the software instructions implemented at the end-user devices. In some examples, different components of the computer-readable instructions 982 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 7:
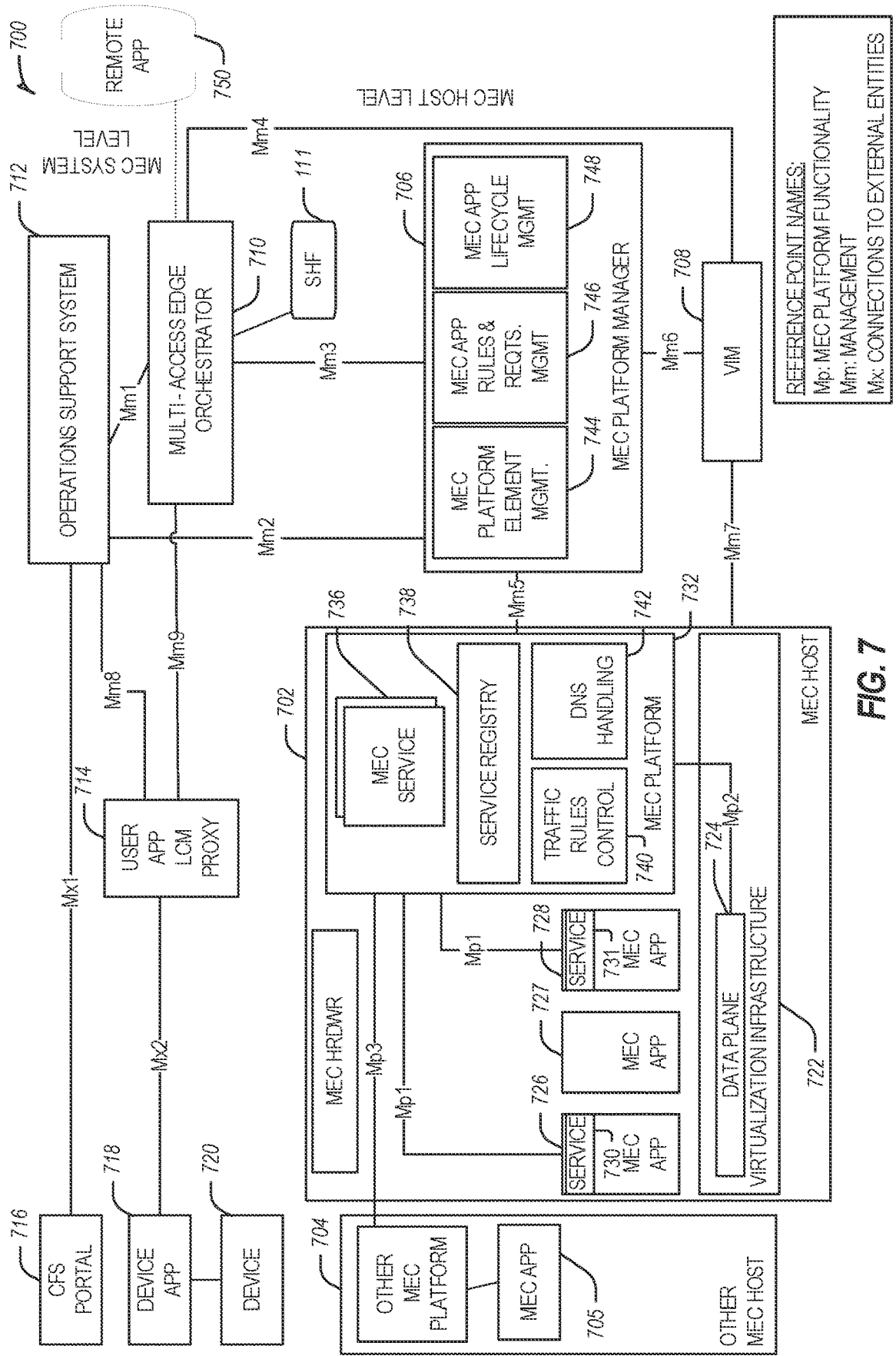
FIG. 7 illustrates an example mobile edge system reference architecture, arranged according to an ETSI Multi-Access Edge Computing (MEC) specification.

FIG. 7 illustrates a mobile edge system reference architecture (or MEC architecture) 700, such as is indicated by ETSI MEC specifications. FIG. 7 specifically illustrates a MEC architecture 700 with MEC hosts 702 and 704 providing functionalities in accordance with the ETSI GS MEC-003 specification. In some aspects, enhancements to the MEC platform 732 and the MEC platform manager 706 may be used for providing specific computing functions within the MEC architecture 700.

Referring to FIG. 7, the MEC network architecture 700 can include MEC hosts 702 and 704, a virtualization infrastructure manager (VIM) 708, a MEC platform manager 706, a MEC orchestrator 710, an operations support system 712, a user app proxy 714, a UE app 718 running on UE 720, and CFS portal 716. The MEC host 702 can include a MEC platform 732 with filtering rules control component 740, a DNS handling component 742, a service registry 738, and MEC services 736. The MEC services 736 can include at least one scheduler, which can be used to select resources for instantiating MEC apps (or NFVs) 726, 727, and 728 upon virtualization infrastructure 722. The MEC apps 726 and 728 can be configured to provide services 730 and 731, which can include processing network communications traffic of different types associated with one or more wireless connections (e.g., connections to one or more RAN or telecom-core network entities). The MEC app 705 instantiated within MEC host 704 can be similar to the MEC apps 726-728 instantiated within MEC host 702. The virtualization infrastructure 722 includes a data plane 724 coupled to the MEC platform via an MP2 interface. Additional interfaces between various network entities of the MEC architecture 700 are illustrated in FIG. 7.

The MEC platform manager 706 can include MEC platform element management component 744, MEC app rules and requirements management component 746, and MEC app lifecycle management component 748. The various entities within the MEC architecture 700 can perform functionalities as disclosed by the ETSI GS MEC-003 specification. In some aspects, the remote application (or app) 750 is configured to communicate with the MEC host 702 (e.g., with the MEC apps 726-728) via the MEC orchestrator 710 and the MEC platform manager 706.

In some embodiments, the MEC orchestrator 710 may be configured with SHF 111. Additionally, the remote app 750 may be used for configuring one or more settings associated with the SHF 111.

Figure 8:
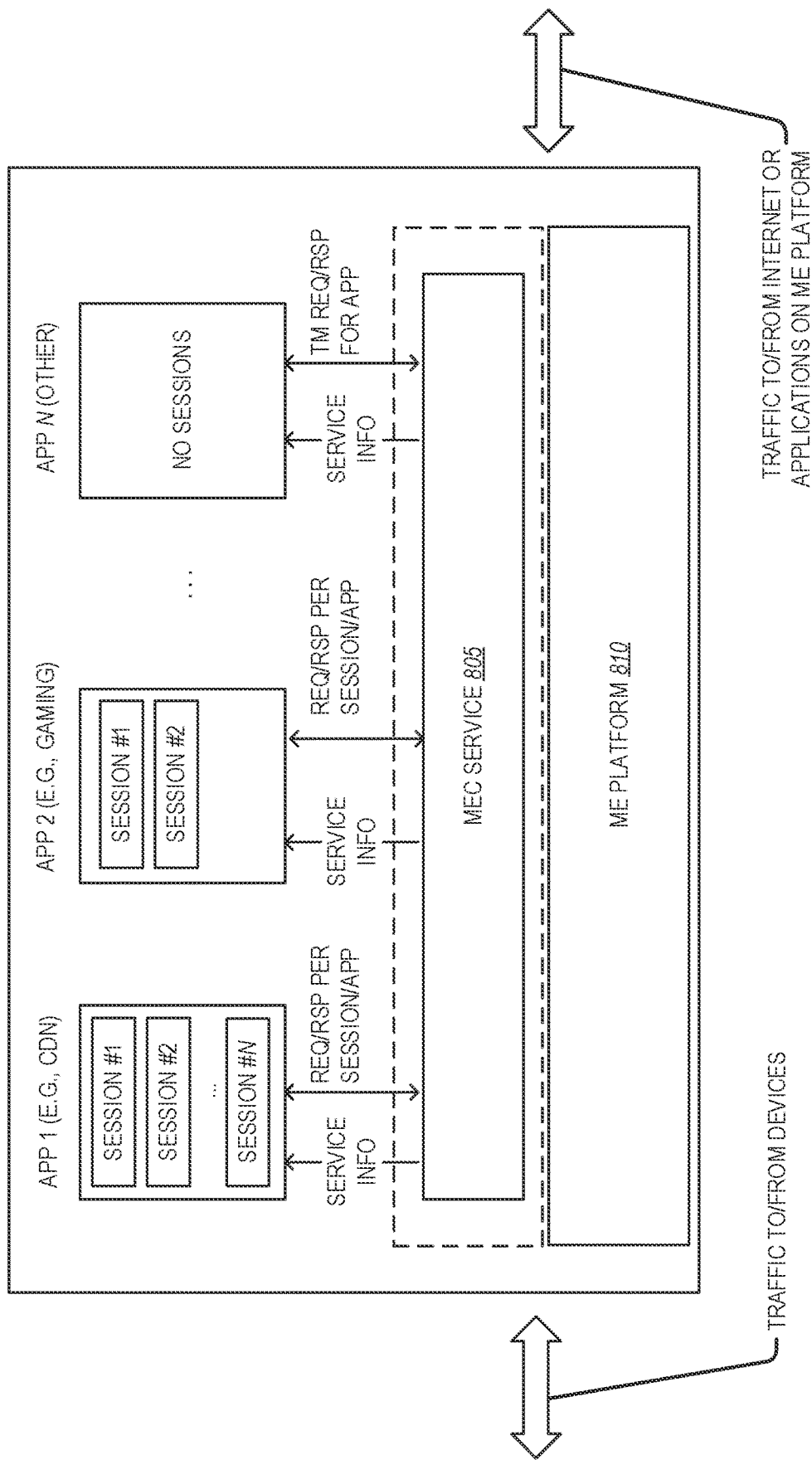
FIG. 8 illustrates a MEC service architecture 800, according to some embodiments.

FIG. 8 illustrates a MEC service architecture 800, according to some embodiments. MEC service architecture 800 includes the MEC service 805, a multi-access edge (ME) platform 810 (corresponding to MEC platform 732), and applications (Apps) 1 to N (Where N is a number). As an example, App 1 may be a content delivery network (CDN) app/service hosting 1, . . . , n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 810) and consumers (e.g., UEs, user apps instantiated by individual UEs, other servers/services, network functions, application functions, etc.). Each session represents an interactive information exchange between two or more elements, such as a client-side app and its corresponding server-side app, a user app instantiated by a UE, and a MEC app instantiated by the ME platform 810, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE and a DN that provides a PDU connectivity service, which is a service that provides for the exchange of PDUs between a UE and a Data Network. An MA PDU session is a PDU Session that provides a PDU connectivity service, which can use one access network at a time, or simultaneously a 3GPP access network and a non-3GPP access network. Furthermore, each session may be associated with a session identifier (ID) which is data the uniquely identifies a session, and each App (or App instance) may be associated with an App ID (or App instance ID) which is data the uniquely identifies an App (or App instance).

The MEC service 805 provides one or more MEC services 736 to MEC service consumers (e.g., Apps 1 to N). The MEC service 805 may optionally run as part of the platform (e.g., ME platform 810) or as an application (e.g., ME app). Different Apps 1 to N, whether managing a single instance or several sessions (e.g., CDN), may request specific service info per their requirements for the whole application instance or different requirements per session. The MEC service 805 may aggregate all the requests and act in a manner that will help optimize the BW usage and improve the Quality of Experience (QoE) for applications.

The MEC service 805 provides a MEC service API that supports both queries and subscriptions (e.g., pub/sub mechanism) that are used over a Representational State Transfer ("REST" or "RESTful") API or alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics concerning the identified request target, and responds to that request with one or more response messages. A client constructs request messages to communicate specific intentions, examines received responses to see if the intentions were carried out, and determines how to interpret the results. The target of an HTTP request is called a "resource". Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of ETSI GS MEC 009 V2.1.1 (2019-01) ("[MEC009]")). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under the control of the deployment, whereas the remaining parts of the URI are under the control of the API specification. In the above root, "apiRoot" and "apiName" are discovered using the service registry (see e.g., service registry 738 in FIG. 7). It includes the scheme ("http" or "https"), host and optional port, and an optional prefix string. For a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

In further examples, any of the compute nodes or devices discussed with reference to the present edge computing systems and environment may be fulfilled based on the components depicted in FIGS. 9A and 9B. Respective edge compute nodes may be embodied as a type of device, appliance, computer, or other "thing" capable of communicating with other edges, networking, or endpoint components. For example, an edge compute device may be embodied as a personal computer, a server, a smartphone, a mobile compute device, a smart appliance, an in-vehicle compute system (e.g., a navigation system), a self-contained device having an outer case, shell, etc., or other device or system capable of performing the described functions.

Figure 9A:
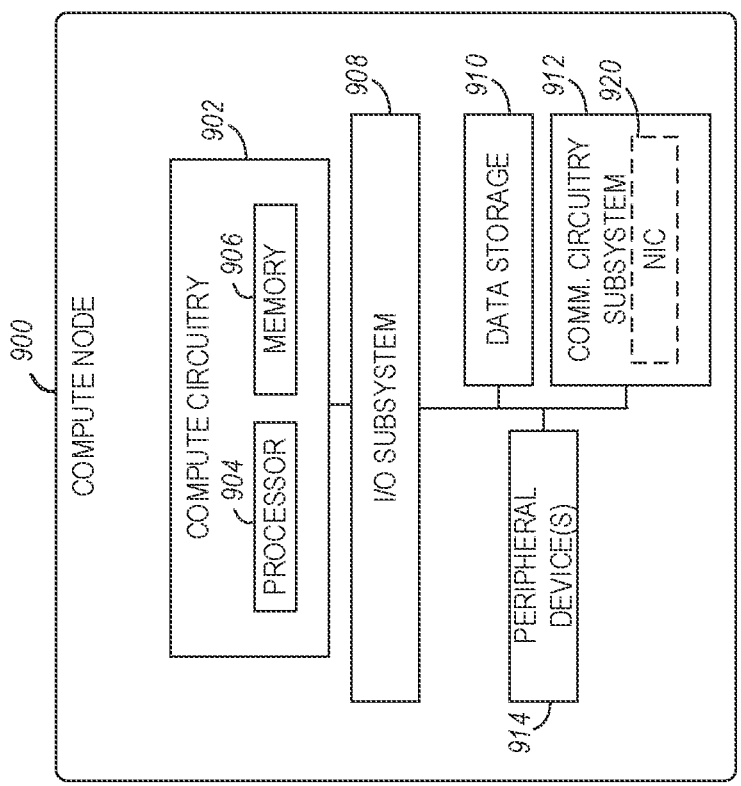
FIG. 9A provides an overview of example components for compute deployed at a compute node in an edge computing system.

In the simplified example depicted in FIG. 9A, an edge compute node 900 includes a compute engine (also referred to herein as "compute circuitry") 902, an input/output (I/O) subsystem 908, one or more data storage devices 910, a communication circuitry subsystem 912, and, optionally, one or more peripheral devices 914. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 900 may be embodied as any type of engine, device, or collection of devices capable of performing various compute functions. In some examples, the compute node 900 may be embodied as a single device such as an integrated circuit, an embedded system, a field-programmable gate array (FPGA), a system-on-a-chip (SOC), or other integrated system or device. In the illustrative example, the compute node 900 includes or is embodied as a processor 904 and a memory 906. The processor 904 may be embodied as any type of processor capable of performing the functions described herein (e.g., executing an application). For example, the processor 904 may be embodied as a multi-core processor(s), microcontroller, a processing unit, a specialized or special purpose processing unit, or another processor or processing/controlling circuit.

In some examples, the processor 904 may be embodied as, include, or be coupled to an FPGA, an application-specific integrated circuit (ASIC), reconfigurable hardware or hardware circuitry, or other specialized hardware to facilitate the performance of the functions described herein. Also in some examples, the processor 904 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within a SOC or integrated with networking circuitry (e.g., in a SmartNIC, or enhanced SmartNIC), acceleration circuitry, storage devices, or AI hardware (e.g., GPUs, programmed FPGAs, Network Processing Units (NPUs), Infrastructure Processing Units (IPUs), Storage Processing Units (SPUs), AI Processors (APUs), Data Processing Unit (DPUs), or other specialized accelerators such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general-purpose processing hardware. However, it will be understood that an xPU, a SOC, a CPU, and other variations of the processor 904 may work in coordination with each other to execute many types of operations and instructions within and on behalf of the compute node 900.

The memory 906 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM), One particular type of DRAM that may be used in a memory module is synchronous dynamic random access memory (SDRAM).

In an example, the memory device is a block addressable memory device, such as those based on NAND or NOR technologies. A memory device may also include a three-dimensional crosspoint memory device (e.g., Intel® 3D XPoint™ memory), or other byte-addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the memory 906 may be integrated into the processor 904. The memory 906 may store various software and data used during operation such as one or more applications, data operated on by the application(s), libraries, and drivers.

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three-dimensional crosspoint memory device, or other bytes addressable write-in-place non-volatile memory (NVM) devices, such as single or multi-level Phase Change Memory (PCM) or phase change memory with a switch (PCMB), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, a combination of any of the above, or other suitable memory. A memory device may also include a three-dimensional crosspoint memory device (e.g., Intel® 3D XPoint™ memory), or other byte-addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross-point architecture in which memory cells sit at the intersection of word lines and bit lines and are individually addressable and in which bit storage is based on a change in bulk resistance. In some examples, all or a portion of the memory 906 may be integrated into the processor 904. The memory 906 may store various software and data used during operation such as one or more applications, data operated on by the application(s), libraries, and drivers.

In some examples, resistor-based and/or transistor-less memory architectures include nanometer-scale phase-change memory (PCM) devices in which a volume of phase-change material resides between at least two electrodes. Portions of the example phase-change material exhibit varying degrees of crystalline phases and amorphous phases, in which varying degrees of resistance between at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods (e.g., approximately 10 years at room temperature). Write operations to example PCM devices (e.g., set to logical "0", set to logical "1", set to an intermediary resistance value) are accomplished by applying one or more current pulses to at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, the implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 902 is communicatively coupled to other components of the compute node 900 via the I/O subsystem 908, which may be embodied as circuitry and/or components to facilitate input/output operations with the compute circuitry 902 (e.g., with the processor 904 and/or the main memory 906) and other components of the compute circuitry 902. For example, the I/O subsystem 908 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 908 may form a portion of a system-on-a-chip (SoC) and be incorporated, along with one or more of the processor 904, the memory 906, and other components of the compute circuitry 902, into the compute circuitry 902.

One or more data storage devices 910 may be embodied as any type of device configured for short-term or long-term storage of data such as, for example, memory devices and circuits, memory cards, hard disk drives, solid-state drives, or other data storage devices. Individual data storage devices may include a system partition that stores data and firmware code for the one or more data storage devices 910. Individual data storage devices of the one or more data storage devices 910 may also include one or more operating system partitions that store data tiles and executables for operating systems depending on, for example, the type of compute node 900.

The communication circuitry subsystem 912 may be embodied as any communication circuit, device, or collection thereof, capable of enabling communications over a network between the compute circuitry 902 and another compute device (e.g., an edge gateway of an implementing edge computing system). The communication circuitry subsystem 912 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LP-WAN) or low-power wide-area (LPWA) protocols, etc.) to effect such communication.

The illustrative communication circuitry subsystem 912 includes a network interface controller (NIC) 920, which may also be referred to as a host fabric interface (HFI). The NIC 920 may be embodied as one or more add-in-boards, daughter cards, network interface cards, controller chips, chipsets, or other devices that may be used by the compute node 900 to connect with another compute device (e.g., an edge gateway node). In some examples, the NIC 920 may be embodied as part of a system-on-a-chip (SoC) that includes one or more processors or included on a multichip package that also contains one or more processors. In some examples, the NIC 920 may include a local processor (not shown) and/or a local memory (not shown) that are both local to the NIC 920. In such examples, the local processor of the NIC 920 may be capable of performing one or more of the functions of the compute circuitry 902 described herein. Additionally, or in such examples, the local memory of the NIC 920 may be integrated into one or more components of the client compute node at the board level, socket level, chip level, and/or other levels.

Additionally, in some examples, a respective compute node 900 may include one or more peripheral devices 914. Such peripheral devices 914 may include any type of peripheral device found in a compute device or server such as audio input devices, a display, other input/output devices, interface devices, and/or other peripheral devices, depending on the particular type of the compute node 900. In further examples, the compute node 900 may be embodied by a respective edge compute node (whether a client, gateway, or aggregation node) in an edge computing system or like forms of appliances, computers, subsystems, circuitry, or other components.

Figure 9B:
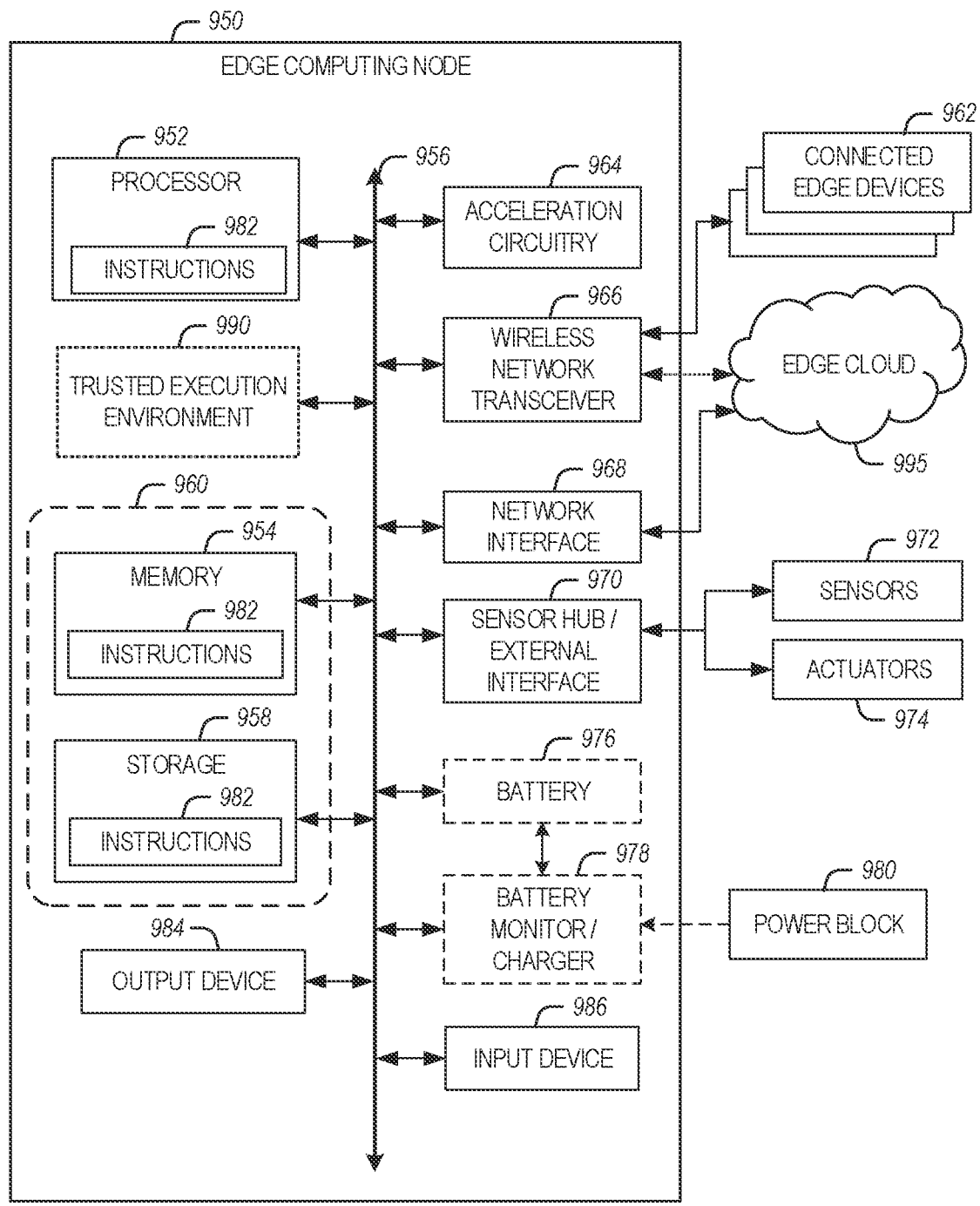
FIG. 9B provides a further overview of example components within a computing device in an edge computing system.

In a more detailed example, FIG. 9B illustrates a block diagram of an example of components that may be present in an edge computing node 950 for implementing the techniques (e.g., operations, processes, methods, and methodologies) described herein. This edge computing node 950 provides a closer view of the respective components of node 900 when implemented as or as part of a computing device (e.g., as a mobile device, a base station, server, gateway, etc.). The edge computing node 950 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 950, or as components otherwise incorporated within a chassis of a larger system.

The edge computing node 950 may include processing circuitry in the form of a processor 952, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 952 may be a part of a system on a chip (SoC) in which the processor 952 and other components are formed into a single integrated circuit, or a single package, such as the Edison™ or Galileo™ SoC boards from Intel Corporation, Santa Clara, California As an example, the processor 952 may include an Intel® Architecture Core™ based CPU processor, such as a Quark™, an Atom™, an i3, an i5, an i7, an i9, or an MCU-class processor, or another such processor available from Intel®. However, any number of other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 952 and accompanying circuitry may be provided in a single socket form factor, multiple socket form factor, or a variety of other formats, including in limited hardware configurations or configurations that include fewer than all elements shown in FIG. 9B.

The processor 952 may communicate with a system memory 954 over an interconnect 956 (e.g., a bus). Any number of memory devices may be used to provide for a given amount of system memory. As an example, the memory 954 may be random access memory (RAM) per a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 958 may also couple to the processor 952 via the interconnect 956. In an example, storage 958 may be implemented via a solid-state disk drive (SSDD). Other devices that may be used for the storage 958 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, mid-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low-power implementations, the storage 958 may be on-die memory or registers associated with the processor 952. However, in some examples, storage 958 may be implemented using a micro hard disk drive (HDD). Further, any number of new technologies may be used for the storage 958 in addition to, or instead of, the technologies described, such as resistance change memories, phase change memories, holographic memories, or chemical memories, among others.

The components may communicate over the interconnect 956. The interconnect 956 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 956 may be a proprietary bus, for example, used in an SoC-based system. Other bus systems may be included, such as an Inter-Integrated Circuit (I2C) interface, a Serial Peripheral Interface (SPI) interface, point-to-point interfaces, and a power bus, among others.

The interconnect 956 may couple the processor 952 to a transceiver 966 (e.g., a wireless network transceiver), for communications with the connected edge devices 962. The transceiver 966 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 962. For example, a wireless local area network (WLAN) unit may be used to implement Wi-Fi® communications under the Institute of Electrical and Electronics Engineers (IEEE) 802.11 standard. Also, wireless wide area communications, e.g., according to a cellular or other wireless wide area protocol, may occur via a wireless wide area network (WWAN) unit.

The wireless network transceiver 966 (or multiple transceivers) may communicate using multiple standards or radios for communications at a different range. For example, the edge computing node 950 may communicate with close devices, e.g., within about 10 meters, using a local transceiver based on Bluetooth Low Energy (BLE), or another low power radio, to save power. More distant connected edge devices 962, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 966 (e.g., a radio transceiver) may be included to communicate with devices or services in the edge cloud 995 via local or wide area network protocols. The wireless network transceiver 966 may be a low-power wide-area (LPWA) transceiver that follows the IEEE 802.15.4, or IEEE 802.15.4g standards, among others. The edge computing node 950 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 966, as described herein. For example, the transceiver 966 may include a cellular transceiver that uses spread spectrum (SPA/SAS) communications for implementing high-speed communications. Further, any number of other protocols may be used, such as Wi-Fi® networks for medium-speed communications and provision of network communications. The transceiver 966 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 968 may be included to provide a wired communication to nodes of the edge cloud 995 or other devices, such as the connected edge devices 962 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 968 may be included to enable connecting to a second network, for example, a first NIC 968 providing communications to the cloud over Ethernet, and a second NIC 968 providing communications to other devices over another type of network.

Given the variety of types of applicable communications from the device to another component or network, applicable communications circuitry used by the device may include or be embodied by any one or more of components 964, 966, 968, or 970. Accordingly, in various examples, applicable means for communicating (e.g., receiving, transmitting, etc.) may be embodied by such communications circuitry.

The edge computing node 950 may include or be coupled to acceleration circuitry 964, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 956 may couple the processor 952 to a sensor hub or external interface 970 that is used to connect additional devices or subsystems. The devices may include sensors 972, such as accelerometers, level sensors, flow sensors, optical light sensors, camera sensors, temperature sensors, global navigation system (e.g., GPS) sensors, pressure sensors, barometric pressure sensors, and the like. The sensor hub or external interface 970 further may be used to connect the edge computing node 950 to actuators 974, such as power switches, valve actuators, an audible sound generator, a visual warning device, and the like.

In some optional examples, various input/output (I/O) devices may be present within or connected to, the edge computing node 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 950. A display or console hardware, in the context of the present system, may be used to provide output and receive input of an edge computing system; to manage components or services of an edge computing system; identify a state of an edge computing component or service, or to conduct any other number of management or administration functions or service use cases.

A battery 976 may power the edge computing node 950, although, in examples in which the edge computing node 950 is mounted in a fixed location, it may have a power supply coupled to an electrical grid, or the battery may be used as a backup or for temporary capabilities. The battery 976 may be a lithium-ion battery, or a metal-air battery, such as a zinc-air battery, an aluminum-air battery, a lithium-air battery, and the like.

A battery monitor/charger 978 may be included in the edge computing node 950 to track the state of charge (SoCh) of the battery 976, if included. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, Texas The battery monitor/charger 978 may communicate the information on battery 976 to the processor 952 over the interconnect 956. The battery monitor/charger 978 may also include an analog-to-digital (ADC) converter that enables the processor 952 to directly monitor the voltage of the battery 976 or the current flow from the battery 976. The battery parameters may be used to determine actions that the edge computing node 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the edge computing node 950. A wireless battery charging circuit, such as an LTC4020 chip from Linear Technologies of Milpitas, California, among others, may be included in the battery monitor/charger 978. The specific charging circuits may be selected based on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in memory 954 and the storage 958, it may be understood that any of the code blocks may be replaced with hardwired circuits, for example, built into an application-specific integrated circuit (ASIC).

In an example, the instructions 982 provided via the memory 954, the storage 958, or the processor 952 may be embodied as a non-transitory, machine-readable medium 960 including code to direct the processor 952 to perform electronic operations in the Edge computing node 950. The processor 952 may access the non-transitory, machine-readable medium 960 over the interconnect 956. For instance, the non-transitory, machine-readable medium 960 may be embodied by devices described for the storage 958 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended periods, permanently, for brief instances, for temporarily buffering, and/or caching). The non-transitory, machine-readable medium 960 may include instructions to direct the processor 952 to perform a specific sequence or flow of actions, for example, as described with respect to the flowchart(s) and block diagram(s) of operations and functionality depicted above. As used herein, the terms "machine-readable medium", "computer-readable medium", "machine-readable storage", and "computer-readable storage" are interchangeable. As used herein, the term "non-transitory computer-readable medium" is expressly defined to include any type of computer-readable storage device and/or storage disk and to exclude propagating signals, and to exclude transmission media.

Also in a specific example, the instructions 982 on the processor 952 (separately, or in combination with the instructions 982 of the machine-readable medium 960) may configure execution or operation of a trusted execution environment (TEE) 990. In an example, the TEE 990 operates as a protected area accessible to processor 952 for secure execution of instructions and secure access to data. Various implementations of the TEE 990, and an accompanying secure area in the processor 952 or the memory 954 may be provided, for instance, through the use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in device 950 through the TEE 990 and the processor 952.

While the illustrated examples of FIG. 9A and FIG. 9B include example components for a compute node and a computing device, respectively, examples disclosed herein are not limited thereto. As used herein, a "computer" may include some or all of the example components of FIGS. 9A and/or 9B in different types of computing environments. Example computing environments include Edge computing devices (e.g., Edge computers) in a distributed networking arrangement such that particular ones of participating Edge computing devices are heterogeneous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 9A and/or 9B, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 9A and/or 9B to satisfy functional objectives of distributed computing tasks. In some examples, the term "compute node" or "computer" only includes the example processor 904, memory 906, and I/O subsystem 908 of FIG. 9A. In some examples, one or more objective functions of a distributed computing task(s) rely on one or more alternate devices/structure located in different parts of an Edge networking environment, such as devices to accommodate data storage (e.g., the one or more data storage devices 910), input/output capabilities (e.g., the example peripheral device(s) 914), and/or network communication capabilities (e.g., the example NIC 920).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 9A and 9B, such computers satisfy execution of distributed computing objective functions without including computing structure that would otherwise be unused and/or underutilized. As such, the term "computer" as used herein includes any combination of the structure of FIGS. 9A and/or 9B that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated given their ability to process one or more tasks of the distributed computing request(s), such that any computer capable of satisfying the tasks proceeds with such computing activity.

In the illustrated examples of FIGS. 9A and 9B, computing devices include operating systems. As used herein, an "operating system" is software to control example computing devices, such as the example Edge compute node 900 of FIG. 9A and/or the example Edge compute node 950 of FIG. 9B. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

In further examples, a non-transitory machine-readable medium (e.g., a computer-readable medium) also includes any medium (e.g., storage device, storage disk, etc.) that is capable of storing, encoding, or carrying instructions for execution by a machine and that cause the machine to perform any one or more of the methodologies of the present disclosure or that is capable of storing, encoding or carrying data structures utilized by or associated with such instructions. A "non-transitory machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks (e.g., SSDs); magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. As used herein, the term non-transitory computer-readable medium is expressly defined to include any type of computer-readable storage device and/or storage disk and to exclude propagating signals, and to exclude transmission media. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 9C:
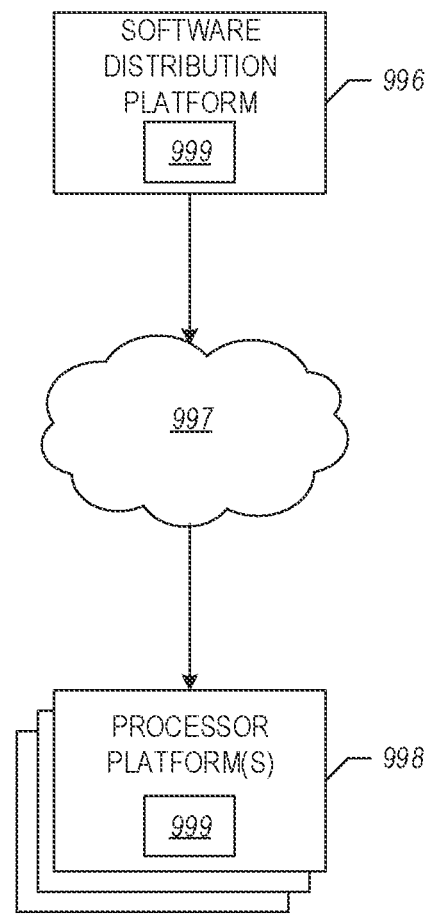
FIG. 9C illustrates a software distribution platform, according to some embodiments.

FIG. 9C illustrates an example software distribution platform 996 to distribute software, such as the example computer-readable instructions 999, to one or more devices, such as processor platform(s) 998 and/or example connected edge devices 962 of FIG. 9B. The example software distribution platform 996 may be implemented by any computer server, data facility, cloud service, etc., capable of storing and transmitting software to other computing devices (e.g., third parties, the example connected edge devices 962 of FIG. 9B). Example connected edge devices may be customers, clients, managing devices (e.g., servers), third parties (e.g., customers of an entity owning and/or operating the software distribution platform 996). Example connected edge devices may operate in commercial and/or home automation environments. In some examples, a third party is a developer, a seller, and/or a licensor of software such as the example computer-readable instructions 999. The third parties may be consumers, users, retailers, OEMs, etc. that purchase and/or license the software for use and/or re-sale and/or sub-licensing. In some examples, distributed software causes the display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 9C, the software distribution platform 996 includes one or more servers and one or more storage devices. The storage devices store the computer-readable instructions 999, which may correspond to the example computer-readable instructions 982 of FIG. 9B, as described above. The one or more servers of the example software distribution platform 996 are in communication with a network 997, which may correspond to any one or more of the Internet and/or any of the example networks described herein. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer-readable instructions 999 from the software distribution platform 996. For example, the software, which may correspond to the example computer-readable instructions 982 of FIG. 9B, may be downloaded to the example processor platform(s) 998 (e.g., example connected edge devices), which is/are to execute the computer-readable instructions 999 to implement the techniques discussed herein. In some examples, one or more servers of the software distribution platform 996 are communicatively connected to one or more security domains and/or security devices through which requests and transmissions of the example computer-readable instructions 999 must pass. In some examples, one or more servers of the software distribution platform 996 periodically offer, transmit, and/or force updates to the software (e.g., the example computer-readable instructions 982 of FIG. 9B which can be the same as the computer-readable instructions 999) to ensure improvements, patches, updates, etc. are distributed and applied to the software at the end-user devices.

In the illustrated example of FIG. 9C, the computer-readable instructions 999 are stored on storage devices of the software distribution platform 996 in a particular format. A format of computer-readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer-readable instructions 999 stored in the software distribution platform 996 are in a first format when transmitted to the example processor platform(s) 996. In some examples, the first format is an executable binary in which particular types of the processor platform(s) 998 can execute. However, in some examples, the first format is uncompiled code that requires one or more preparation tasks to transform the first format to a second format to enable execution on the example processor platform(s) 998. For instance, the receiving processor platform.(s) 998 may need to compile the computer-readable instructions 999 in the first format to generate executable code in a second format that is capable of being executed on the processor platform (s) 998. In still other examples, the first format is interpreted code that, upon reaching the processor platform(s) 998, is interpreted by an interpreter to facilitate the execution of instructions.

Under Failure-Attack-Fault-Outage (FAFO) or disaster (e.g., earthquake, volcanic eruption, flooding) events, in case the aggregation network and the backhaul networks fail, one approach towards resilient operation or self-healing path for the Next Generation (NG or NextG) networks is to have an active-standby network configuration invocation for survivability of such NextG networks. Fundamentally, to do so, the foremost requirement would be to detect, track, update and maintain a backup pool of radio frequency (RF) spectrum, which can be used to provide fallback network capacity in the event of the frontline network FAFO event (assuming the backup network remains in stand-by mode). Such a backup pool of radio frequency spectrum can also be used for handling disaster events where access to the licensed spectrum may be limited to a fraction of the total due to devastated infrastructure, power lines, mobile network operator (MNO) offices, etc. To form such dynamic active-standby network following FAFO event (or disaster), depending upon the scale of the failure, a sufficient amount of RF spectrum, (which is already scarce radio resource), may not be readily available in a licensed band, which has exclusive rights for the owners of the spectrum (government, telco operators, cable operators, and others). Thus, the unlicensed band, which allows opportunistic reuse and sharing can be a candidate to revert to for creating such a fallback network. However, as the unlicensed spectrum usage varies dynamically, it is important to identify and collect the communications opportunities (vacant bands/sub-bands/channels/subchannels) within the unlicensed band for possible use in times of disaster. However, techniques for detecting/sensing and harvesting such opportunities for building networks resilient to FAFO by offering spectrum opportunities to support the survivable operation of backup networks are not being currently addressed in conventional network configurations.

The disclosed techniques use unlicensed spectrum harvesting for providing additional spectral capacity at hand (for MNOs, for instance) via opportunistic occupancy map building at single and multi (inter)-operator (collaborative in case of multi-operator) in a dynamic manner for preparedness against such FAFO events. In some embodiments, network elements/nodes (e.g., User Equipments (UEs), Roadside Units (RSUs), Base Stations (BSs), and other actors) have Spectrum Sensing (SS) capabilities. In specific, the disclosed techniques may be based on the following enablers:

(1) Crowdsourced Spectrum Occupancy (CSO) Map Building per MNO. Different kinds of network elements with SS capabilities and heterogeneous compute capabilities can be utilized for contributing in a "spectrum-crowd-sourcing" manner for generating the spectrum occupancy map in a distributed (but collaboration-friendly, as explained below) manner.

In some aspects, RAN spectrum occupancy detection and occupancy-map of RAN spectrum generation may be performed by utilizing all the nodes distributed across geolocations (UEs, RSUs, vehicles).

In some aspects, a mix of classical and Reinforcement Learning (RL) based Hybrid-spectrum sensing (HSS) techniques may be used. For example, such techniques may be leveraging joint non-ML-based (energy detector, autocorrelation detector, cyclo-stationary feature detector, wide-band sensing, and others) and ML-based approaches for spectrum sensing by using distributed edge nodes as spectrum sensing nodes. To this end, ML (for example, convolutional neural networks, CNNs, or deep neural networks, DNNs)-based sensors can be used for example, for historical and current sensing data based future occupancy predictions, while non-ML based sensors (such as ED, cyclo-stationary, autocorrelation) can be used to train the NNs initially as well as to keep undertaking instantaneous spectrum occupancy sensing for establishing an up-to-date radio occupancy map data. In such an example, model-based spectrum sensing (SS) will keep feeding to ML-framework-based SS to evolve it over time. The disclosed techniques are focused on formalizing an RL framework for crowdsourced SS.

(2) Inter Mobile Network Operator (MNO) Collaborative Spectrum Occupancy (SO) analytics sharing. In some aspects, collection and sharing of unlicensed spectrum usage data from distributed edge users (ranging from manufacturing, businesses, homes) located at different geolocations along with the context of occupancy (e.g., reason of occupancy, type of device, location of the device) may be used to create a global map of the spectrum occupancy to be available at the edge (local)/cloud (global) network across MNOs periodically as well as based on events. Such SO may be collaboratively shared across MNOs to boost the scale of opportunistic spectrum availability and harvesting of the identified opportunities for building and maintaining such FAFO or disaster event networks.

The disclosed techniques may be used to support resilient next generation communication networks, including servers at the edge or programmable devices (e.g., programmable switches with computing capabilities, from the edge through the cloud). The servers may be used to run centralized SDNs and workloads for spectrum sharing and management while the end-user devices may participate in the disclosed crowd-sourced mechanisms to sense/detect and augment the sharing of the radio frequency spectrum. Servers equipped with wireless capabilities could also participate in the crowd sourcing spectrum occupancy status collection. Primary users benefiting from the disclosed techniques include Telecommunications/Mobile Network Operators (MNOs), private/enterprise networks, defense agencies, public safety agencies, among others whose need for spectrum management in bringing up the active-standby network under Failure or Disaster may be significant.

In addition to existing communication hands, new 5G bands comprise licensed as well as unlicensed/shared spectrum thus yielding a diverse range of spectrum types/bands. In networks associated with support for both license-assisted and standalone use of unlicensed spectrum, the New Radio Unlicensed (NR-U) supports the following ranges of unlicensed bands some of which are already available while some others being under study/review for consideration in the United States and the rest of the World as summarized in Table 1 below, which illustrates unlicensed spectrum bands in 3GPP for NR-U in North America and Europe.

TABLE 1

| Region | Mid-bands: 1-7 GHz (sub-7) | High bands: 24+ GHz (mmWave) |
|---|---|---|
| United States | 5.2-5.8 GHz and 5.9-7.1 GHz (Available) | 57-71 GHz (Under study/review) |
| Canada | 5.2-5.8 GHz (Available) | 57-71 GHz (Under study/review) |
| EU | 5.2-5.9 GHz (Available), 5.9-6.4 GHz (Under study/review) | 57-71 GHz (Under study/review) |
| UK | 5.2-5.9 GHz (Available), 5.9-6.4 GHz (Available) | 57-71 GHz (Under study/review) |

Apart from the above, for instance, in the US, the 3.55-3.7 GHz CBRS band has been opened for shared access under a three-tiered access model consisting of incumbents (federal government and fixed satellite service users), priority access licensees (PALs), and general authorized access (GAA) users. Thus, the 6 GHz band brings new unlicensed bandwidth for Wi-Fi and 5G as standardized for 5G NR-U in the US where a 1200 MHz block of new unlicensed spectrum (e.g., 5.9-7.1 GHz) is now available for Wi-Fi and 5G for supporting multi-gigabit throughput, ultra-low latency, and massive capacity. In this regard, the unlicensed spectrum is going to be even more important for 5G and beyond, including next generation wireless networks.

Therefore, such spectrum configurations motivate the need for harvesting the unlicensed spectrum since the licensed spectrum is mostly controlled by the operators and is not necessarily/easily shared for public access. In some aspects, for increased resiliency of Next Generation networks, the ability to harvest parts of the unlicensed spectrum is crucial either to yield additional capacity or to build and operate backup or fallback or secondary networks in the event of fault-attack-failure-outage (FAFO) of the primary or the main operational network. Such harvesting may occur in the backend starting from a normal, non-FAFO timeline.

To this end, the first step in harvesting unlicensed spectrum may be to have at the secondary network nodes, the ability to sense any unused spectrum and identify "holes" within the spectrum in question which serves as the opportunities for forming the secondary communication networks when FAFO events become imminent. Spectrum sensing performance and configurations depend on several parameters, such as (and not limited to): a band of interest (carrier frequency around which the bandwidth of interest is centered); bandwidth of interest (wideband vs. narrowband); sensing granularity (minimum unit of sensing bandwidth which may be several RBs, a subchannel, or several sub-channels); wireless propagation effects, interference environment, and noise impairments; and type of spectrum sensing algorithm or detection technique used, and a sampling rate of the detector, SNR of the received signal, the complexity of the detector, and others.

In some aspects, the following binary hypothesis testing framework may be used in connection with the disclosed spectrum harvesting techniques, including SHF 111. In spectrum sensing, the binary hypothesis testing problem formulation for a wireless signal $s_i$ propagating through impaired channel $h_i$ (including fading, shadowing) and noise $n_i$ corruption at the receiver, where i={1,2, ..., S}, S being the signal sample size, can be expressed as follows:

$$y_i = \begin{cases} h_i s_i + n_i : H_1 \\ n_i : H_0 \end{cases} \quad (1)$$

Depending upon the type of detector, the test statistics resulting from equation (1) can take different forms following the likelihood ratio test (LRT) formalization. Nevertheless, following Bayes' rule, the likelihood ratio test (LRT) can be formulated to result in test statistics T and detection threshold $\lambda$ based function for the detection probability (P_d) and false alarm probabilities (P_f) at the spectrum sensing node as:

$$P_d = Pr(T \geq \lambda | H_1), P_f = Pr(T < \lambda | H_0). \quad (2)$$

As used herein, the false alarm probability is a probability that the channel is indicated as in an occupied status but the channel is, in fact, unoccupied. In some aspects, the following Q-learning techniques may be used in connection with the disclosed spectrum harvesting techniques, including SHF 111. An RL framework based on Q-learning includes the agent and environment where the agent in a state s interacts with the environment by taking an action $a \in A$ followed by which the agent receives a reward r(s, a). Then, the agent takes this r(s, a) as an input to update Q(s, a) leading into state s'. With Q (s, a) updated every iteration, the agent keeps learning from the state-action-reward framework (history) as follows:

$$Q(s, a) = (1-\alpha)Q(s, a) + \alpha\{r(s, a) + \beta \max_{b' \in A}[Q(s', b')]\}, \quad (3)$$

where $0 \leq \alpha \leq 1$ is the learning rate such that with lower $\alpha$, the agent learns less from instant rewards and more from history; $0 \leq \beta \leq 1$ is the discount factor for attenuating the future rewards.

In some aspects, details of the proposed techniques and protocol for crowdsource-based unlicensed spectrum harvesting are disclosed herein below. Techniques to build spectrum sensing based harvested pool of available spectral resources available to a mobile network operator (MNO) include forming one or more of a mobile "Harvester-based networks (HBNs)" operated by the MNO as part of the normal operation of the network (pre-disaster or pre-failure) in a passive manner without adding much complexity or cost to the normal operation of the network.

In some embodiments, the spectrum harvesting entity (or "harvester") can be designated as a base station (BS) of the NGN or even a microcell deployed within specific local geolocation (e.g., enterprise/business, intersection within a smart city, a MEC in a building, and so forth). Furthermore, the disclosed techniques may also use a dedicated/standalone deployment of the harvester by the MNOs for harvesting (which can be low-power, low-cost deployment, lower than regular BS). The harvester can itself be equipped with one or more spectrum sensing systems comprising of RF antenna, baseband processing unit, and detector to decide on the presence or absence of any primary network signal/user in the sensed spectral channel of interest.

In some embodiments, the HBN comprises user equipment (UE) members which are equipped with at least one or more spectrum sensing systems comprising of an RF antenna, baseband processing unit, and detector to make decisions on the presence or absence of any primary network signal/user in the sensed spectral channel of interest (e.g., licensed or unlicensed spectrum). In some aspects, a binary hypothesis testing framework can be utilized for decision-making on the occupancy status of the channel. In addition to the occupancy status, the disclosed techniques may also include calculating and logging the confidence of detection of the spectrum occupancy in terms of two key metrics: (i) probability of detection (P_d), and (ii) probability of false alarm (P_f). Thus, the occupancy status of the channel of interest is characterized in terms of the triple {Channel Occupancy Status (COS) (Occupied/Free), P_d, P_f}. For brevity, 'confidence of occupancy (COO)' is interchangeably used to represent the pair {P_d, P_f} throughout the rest of the disclosure. Thus, the triple {COS, P_d, P_f} may be interchangeably used with {COS, COO}. This clause may be represented as Step 1 (diagram 1002) shown in FIG. 10. Furthermore, the following sub-proposals/clauses apply to Step 1 of FIG. 10:

(a) In addition to the above, an RL framework with the underlying algorithm for crowdsourced spectrum sensing may be used by the disclosed techniques and is described herein below.

(b) The crowdsource selection rule for the disclosed RL-framework-based techniques is also described in greater detail herein below.

(c) In some aspects, the disclosed techniques do not preclude the UE members (e.g., crowdsourcing nodes) within the HBN to be able to communicate with each other without the intervention of the harvester. This can be possible via direct peer-to-peer (e.g. D2D, V2V) modes of operation in the cellular standards. The motivation behind direct communications within the UEs in the HBN is to be able to share each other's spectrum occupancy status/findings to create a distributed awareness of the spectrum occupancy environment. This may be particularly useful for reducing the reliance of the MNO on a specific harvester and is necessary also to support harvester handover in time of need—say, when the particular harvester serving those specific UEs goes down due to FAFO, those UEs could be moved over to the jurisdiction of another harvester in the vicinity. In aspects when there are no statically deployed harvesters in the vicinity, the MNO may be able to dispatch a mobile harvester (e.g., harvester M shown in FIG. 10) in an on-demand/ad-hoc fashion once the serving harvester is detected to be in FAFO.

(d) Depending on the quality of service required by the services that are being accessed through the specific accesses (base stations), the selection of the right spectrum may provide the required bandwidth and latency per service level agreement. Even in the unlicensed spectrum resource pool, sub-pool can be reserved for services with stringent SLA requirements and some low priority services can be rejected due to limited resources (so that they don't try to retransmit or grab resources repeatedly).

(e) On top of (d), dynamic network slicing may need to be configured when the spectrum is assigned to provide the right network resources to the high priority traffic.

Following the above processing, the UEs may be utilized as crowdsources, where the UEs report their spectrum sensing finding to the harvester. The following meta-information may be included (at least) in the Spectrum Occupancy Report (SOR) to the harvester: {COS, COO}, frequency band (in Hz), scanned bandwidth (in Hz), time index/stamp, frequency/channel/sub-channel index, geolocation, device ID, other complementary configuration and parameters (not meant to exclusive of the below) (e.g., RF/antenna parameters, baseband sampling frequency, sample size, detected signal strength (RSRP, RSRQ) or in-band energy, Quality of Service (QoS) requirements, waveform, numerology, capabilities (e.g., ability to support slices), etc.). The above processing is represented by Step 2 (diagram 1004) shown in FIG. 10.

After receiving the SOR as described above, the harvester now has a detailed knowledge of the spectrum occupancy status and the meta-information associated with it (as described above). With the geolocation embedded in the SOR, the harvester can construct a first-tier Edge Aggregated Spectrum Occupancy Map (EASOM) with the confidence associated with each time-frequency grid indicating the occupied/available status along with either of the two levels (e.g., low occupancy confidence or high occupancy confidence). This processing is represented by Step 3 (diagram 1006) shown in FIG. 10.

Following the above processing, as the final step, (Step 4 represented by diagram 1008 in FIG. 10), each of the individual harvesters may report their EASOM (built-in Step 3 of FIG. 10) to the MNO. The MNO is responsible to acquire, update, and maintain the MNO-Aggregated Spectrum Occupancy Map (MASOM) via a second-tier aggregated occupancy map.

Figure 10:
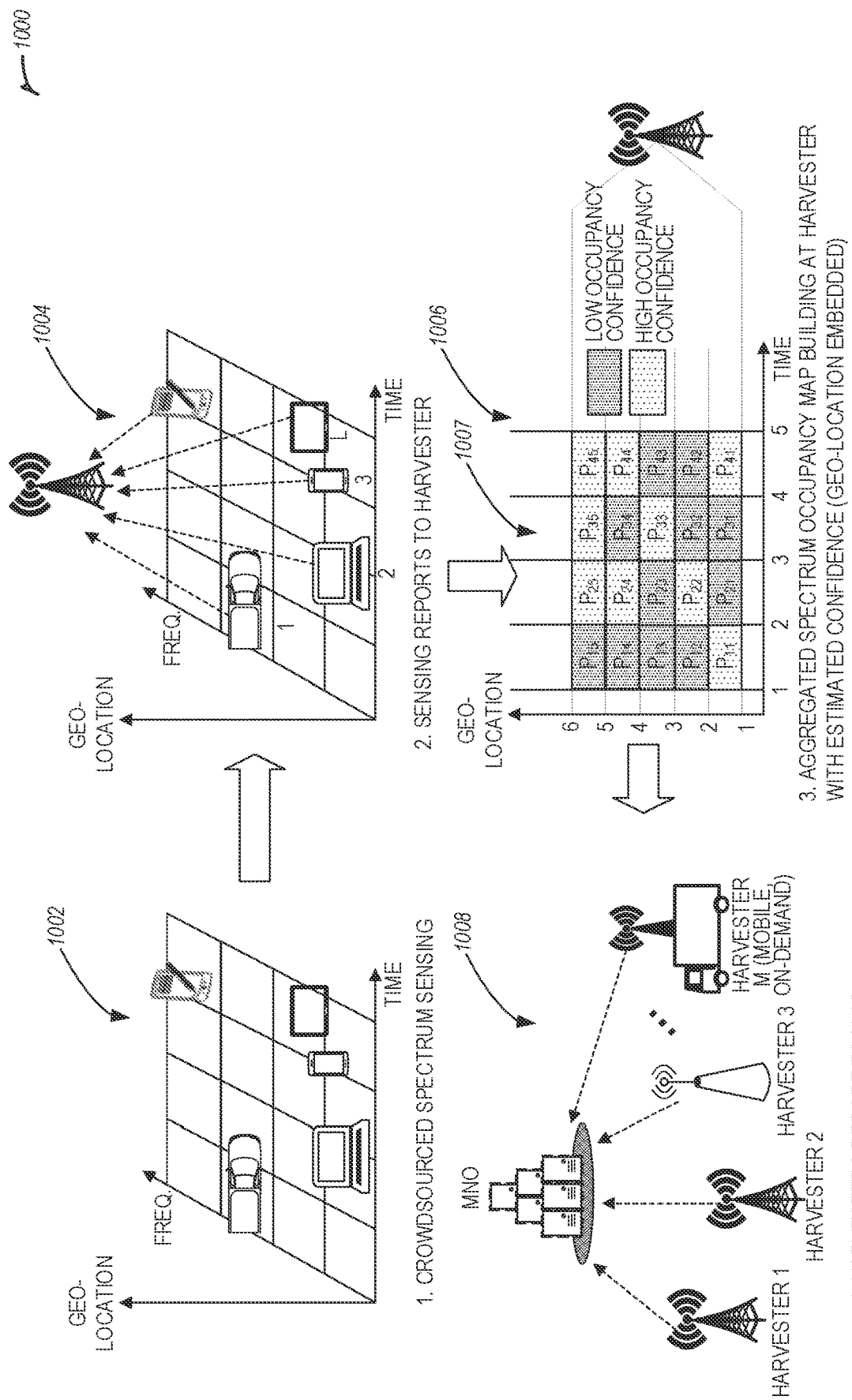
FIG. 10 illustrates crowdsourced spectrum sensing in a wireless network, according to some embodiments.

In some embodiments, in creating such MASOM, the MNOs can acquire the EASOM even from harvesters which are not only the macro-base station and can comprise of:

(a) Static Micro-base stations (Harvester 3, as shown in Step 4 of FIG. 10), and/or (b) Mobile Micro-base stations (Harvester M, as shown in Step 4 of FIG. 10). In some aspects, the mobile harvesters can be an on-demand harvester dispatched by the MNO for sensing specific swaths of spectrum in order specific to particular geolocation which may not be covered by the static harvesters and out of reach of the mobile UEs (e.g., to cover for rural areas, non-public access areas within the government, enterprise, etc.). Such mobile scanning/sensing can also be used to build a behavioral and dynamic spectrum usage over the areas traversed by the mobile BS and can be used to collect logs for spectrum occupancy analytics at the MNOs for predictive analysis. Some of the information may be secured or anonymized through technologies such as homomorphic encryption. In this regard, as information is provided from the devices aiming to be shared with an MNO, a harvester may still access the key fields that are needed to build the heatmaps. Whereas other provided information may only be communicated to the MNO.

FIG. 10 illustrates crowdsourced spectrum sensing 1000 in a wireless network, according to some embodiments. Referring to FIG. 10, the crowdsourced spectrum sensing 1000 may include Steps 1, 2, 3, and 4 (illustrated at corresponding diagrams 1002, 1004, 1006, and 1008), as discussed above. At step 1 (illustrated in diagram 1002), crowdsourced spectrum sensing takes place, which may be based on frequency, time, and geolocation of the sensing/crowdsourcing node (or agent). At step 2 (illustrated in diagram 1004), SORs are communicated from the crowdsourcing nodes to the harvester. At step 3 (illustrated in diagram 1006), an aggregated spectrum occupancy map 1007 is generated by the harvester which may include estimated confidence level (e.g., low occupancy confidence or high occupancy confidence) associated with the time-frequency-geolocation grid sensed by individual crowdsourcing nodes. AT step 4 (illustrated in diagram 1008), multiple harvesters may report corresponding aggregated spectrum occupancy maps to the MNO so that the MNO can generate an MNO-aggregated spectrum occupancy map In some embodiments, the disclosed techniques may use reinforcement learning (RL)-based crowdsourced spectrum sensing (CSS) framework and algorithm as discussed herein. The RL framework for CSS is discussed herein.

In some aspects, an agent can include each of the crowdsource nodes $CS_l$, where $1 \leq l \leq L$.

In some aspects, states can be configured as follows. The occupancy status of all channels of interest is modeled as states where 'occupied' and 'free' states represent the channel busy and idle conditions, respectively. In this regard, the states are dynamic and depend upon the activity in the sensed channel of interest.

In some aspects, an action may be considered as the decision to be made by an agent in a state. $CS_l$ may choose an action $a=c_i$, $1 \leq i \leq A$, which means that $CS_l$ chooses the channel $c_i$ to sense. In this regard, the action selection strategy may be responsible for defining the rule to select actions.

In some aspects, a reward may be defined as follows. Once the action is selected, the choice of action may be quantified by the reward. The reward function r(s, a) may be assumed to obtain the state-action mapped to a real-valued reward. Here, the $CS_l$ calculates r(s, a) based on its local detector. In some aspects, the detectors may be assumed to be the model-based detector which can be one or more (single or multi-staged) of the state-of-the-art detectors such as the energy detector, autocorrelation detector, cyclo-stationary feature detector, and the likes. Furthermore, apart from model-based detectors, hybrid mechanisms combining model-based and machine learning (ML) based spectrum sensing can be used. In some aspects, ML (e.g., CNNs or DNNs)-based sensing can be used for example, for historical and current sensing data based future occupancy predictions while non-ML based sensors (such as ED, cyclo-stationary, autocorrelation) can be used to train the NNs initially as well as to keep undertaking instantaneous spectrum occupancy sensing for establishing an up-to-date radio occupancy map data. In such an example, model-based SS may be used to keep feeding to the RL-framework-based SS to evolve it over time. Details of rewards calculation are discussed herein below.

In some aspects, action selection may be defined and configured as follows. The $CS_l$ chooses $c_i$ as the channel to be detected/sensed using the $\epsilon$-greedy strategy, which means that the channel for sensing with the highest priority is selected with a probability of $1-\epsilon$, thus representing exploitation while $\epsilon$ represents exploration (random selection of channel with probability $\epsilon$. Here, $\epsilon$ is the knob that helps tune the exploration versus exploitation strategy. Larger $\epsilon$ thus leads to larger scanning overhead (more exploration), whereas smaller $\epsilon$ leads to exploitation of the current knowledge to perform the best selection (less scanning overhead). This factor is thus suitable to capture the dynamic statuses-based selection of the channels for sensing.

In some aspects, the calculation of rewards may be configured as follows. For quantifying the reward, suppose at time t, $CS_l$ selects the channel $c_i$ per the action selection policy and then senses the chosen channel $c_i$. In this case, the hypothesis $H_0$ is true and $CS_l$ would decide the channel as idle, whereas in the case of $H_1$ as true, $CS_l$ would decide the channel as busy. In some aspects, the (l–th) sensing decision on the channel status is then reported by $CS_l$ along with the confidence of detection pair $\{P_d^l(t), P_f^l(t)\}$ to the harvester that is responsible for combining this local detection result as well as the results from the other (L–1) crowdsources so that the aggregate reward for the channel $c_i$ at the harvester is proposed to be as follows:

$$r^l(s_t, c_i) = \begin{cases} 1 - \sum_{j \in (1,L)} \frac{1 - P_f^j(t)}{N}, & \text{if } \hat{H} = H_0, \\ 1 - \sum_{j \in (1,L)} \frac{1 - P_d^j(t)}{N}, & \text{if } \hat{H} = H_1 \end{cases} \quad (4)$$

Once the reward is computed, $CS_l$ may update the Q-value for channel $c_i$ as follows:

$$Q^l(s_{t+1}, c_i) = (1-\alpha) \cdot Q^l(s_t, c_i) + \alpha \{r^l(s_t, c_i) - \beta(e^{-\tau \cdot x})\}, \quad (5)$$

where $0 \leq \alpha \leq 1$ is the learning rate, $0 \leq \beta \leq 1$ is the discount factor, $0 \leq \tau \leq 1$ is a weighting constant for x; x being the number of attempts required for $CS_l$ to find an idle channel.

In some embodiments, the above Q-learning-based channel status estimation/prediction may assist each of the crowdsource sensing nodes to find the order of detection of channels and maintain a Q-table for each of the channels that are of interest (within sensing bandwidth range) of the sensing node. At the initial stages of spectrum sensing, such Q-table may be initialized (to zero) and populated with time via the $\epsilon$-greedy strategy according to the priority list. Once an idle channel is detected, $CS_l$ calculates the reward and updates the Q-value for the channel resulting in a new priority list of the channels for the next round thus tracking the dynamically changing channel idle/busy states with the detection confidence per the model-based spectrum sensing algorithm deployed. Such updated channel status along with the detection confidence pair $\{P_d, P_f\}$ are then reported to the associated harvester H in each round (as discussed herein above).

In some embodiments, the disclosed techniques may use the following methods and protocols for the selection and update of active crowdsources by the spectrum harvester. In a pre-FAFO scenario, for a given harvesting network at a given time, a max of L UEs associated with the harvester may be assumed where L can vary dynamically for the harvesting network depending on the harvester's cell size, transmission power available, total serving capacity (inclusive of compute/comms tradeoffs), etc. (for instance, consider the heterogeneity among these parameters between a macro-cell BS vs. a micro-cell BS). In this regard, the following mechanism may be used for selection and update of the crowdsources by the harvester:

Step 1: The harvester starts by selecting all active (in wake-up/power-up/actively operating) crowdsourcing nodes from within the max L number, where $\gamma \in \{1,2, \ldots L\}$. It may be reasonably assumed that the operating parameters of the crowdsources (also referred to as crowdsourcing nodes) are known in advance to the harvester (since they are associated/registered to the harvester in advance of this step).

In some embodiments, the harvester forms an initial pool of L crowdsources and sends an initial request (REQ) to all of the crowdsources for acquiring spectrum occupancy status along with other associated meta-information.

Step 2: The crowdsources send a response RESP including the information specified herein above (e.g., the SOR with a triple, etc.).

Step 3: The harvester then groups/clusters the crowdsources based on the RESP from the crowdsourcing UEs depending upon the triple {frequency band, scanned bandwidth, geo-location}.

Step 4: For each group/cluster, the crowdsources are then ranked per highest {COS, COO} metric. In some embodiments, one criterion to rank idle channels to be in the order of highest to lowest probability of detection such that the probability of false alarm is bounded. One example is to select the channels for which $P\_d \geq 0.9$ such $P\_f \leq 0.1$ first and then further rank the channels per their reported $P\_d$ values while respecting the $P\_f$ upper bound/limit. Such high-ranked crowdsources would then be prioritized and added to the group/cluster. The corresponding channel IDs are added to the pool of available spectrum for harvesting. The crowdsources with the lowest {COS, COO} are removed from the list/group.

Step 5: For the subsequent rounds, the group/cluster may be updated based on the above Steps 2 through 4 via the REQ/RESP loops, thus capturing the dynamics of the spectrum hole/occupancy maps.

Figure 11:
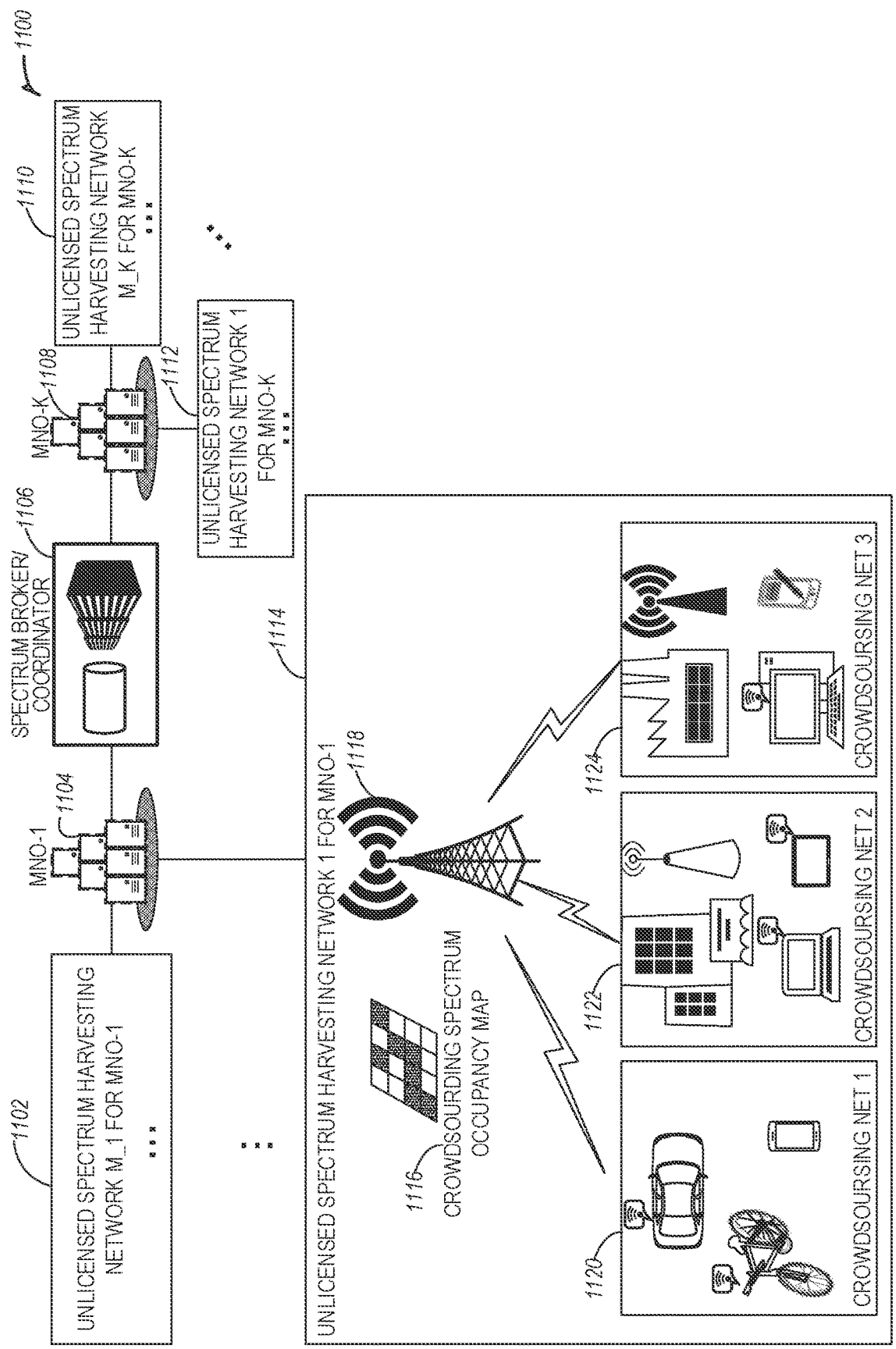
FIG. 11 illustrates a crowdsourced spectrum occupancy map building network with inter-operator collaboration, according to some embodiments.

In some embodiments, the disclosed techniques include the following methods for inter-MNO collaborative spectrum occupancy awareness and spectrum sharing as illustrated in FIG. 11. FIG. 11 illustrates a crowdsourced spectrum occupancy map building network 1100 with inter-operator collaboration, according to some embodiments. Referring to FIG. 11, the MNO-1 1104 can be associated with unlicensed spectrum harvesting networks 1 1114, . . . , M_1 1102. Similarly, MNO-K 1108 can be associated with unlicensed spectrum harvesting networks 1 1112, . . . , M_K 1110. The unlicensed spectrum harvesting networks (e.g., network 1114) may include crowdsourcing networks 1120, 1122, . . . , 1124 which are all associated with harvester 1118. The harvester 1118 may generate an edge aggregate spectrum occupancy map (also referred to as crowdsourcing spectrum occupancy map) 1116, which can be communicated to MNO-1 1104 (e.g., for consolidation and generation of MNO-aggregated spectrum occupancy map).

In the example embodiment of FIG. 11, the proposed methods are stated to cover the case of inter-MNO with a proposal for inter-MNO collaborative spectrum occupancy awareness building. We assume a Spectrum Broker/Coordinator (SBC) 1106 based inter-MNO collaboration where the SBC 1106 is responsible for creating an aggregate database using the reported spectrum occupancy analytics by the MNOs 1104 and 1108 (as shown in FIG. 11). In this regard, the SBC 1106, which may not belong to any MNOs, may be responsible for the following control functions:

(a) Creating a globally aggregated spectrum occupancy map database (GASOMD) from each MNO's MASOM, which can be accessed by any MNO participating or not participating in the spectrum harvesting procedures. Such a global pool of harvested/unused spectrum can be available for opportunistic use and deployment of the backup network in case of FAFO events.

(b) Handling the time-synchronization between the MNOs (and their harvesters). In addition, across the MNOs, the harvesters which may strongly interfere with each other may use time-division multiplexing.

(c) Scheduling/allocating opportunistic spectrum resources based on the REQUEST/RESPONSE protocol where the spectrum access request is made by the MNOs and the spectrum broker assigns spectrum for the request in a time-shared manner across MNOs. Such REQUEST/RESPONSE-based temporary allocations may be used in the unlicensed operation to avoid collisions, and conflicts in spectrum/channel access for a graceful transition from non-FAFO operation to FAFO operation in time of need.

(d) Enforcing the SLAs for the opportunistically accessed spectrum. For this purpose, a tiered operation model that keeps in mind the end-users and the service access request and QoS requirements is necessary. An example spectrum sharing paradigm is illustrated in FIG. 12 and is discussed herein below.

Figure 12:
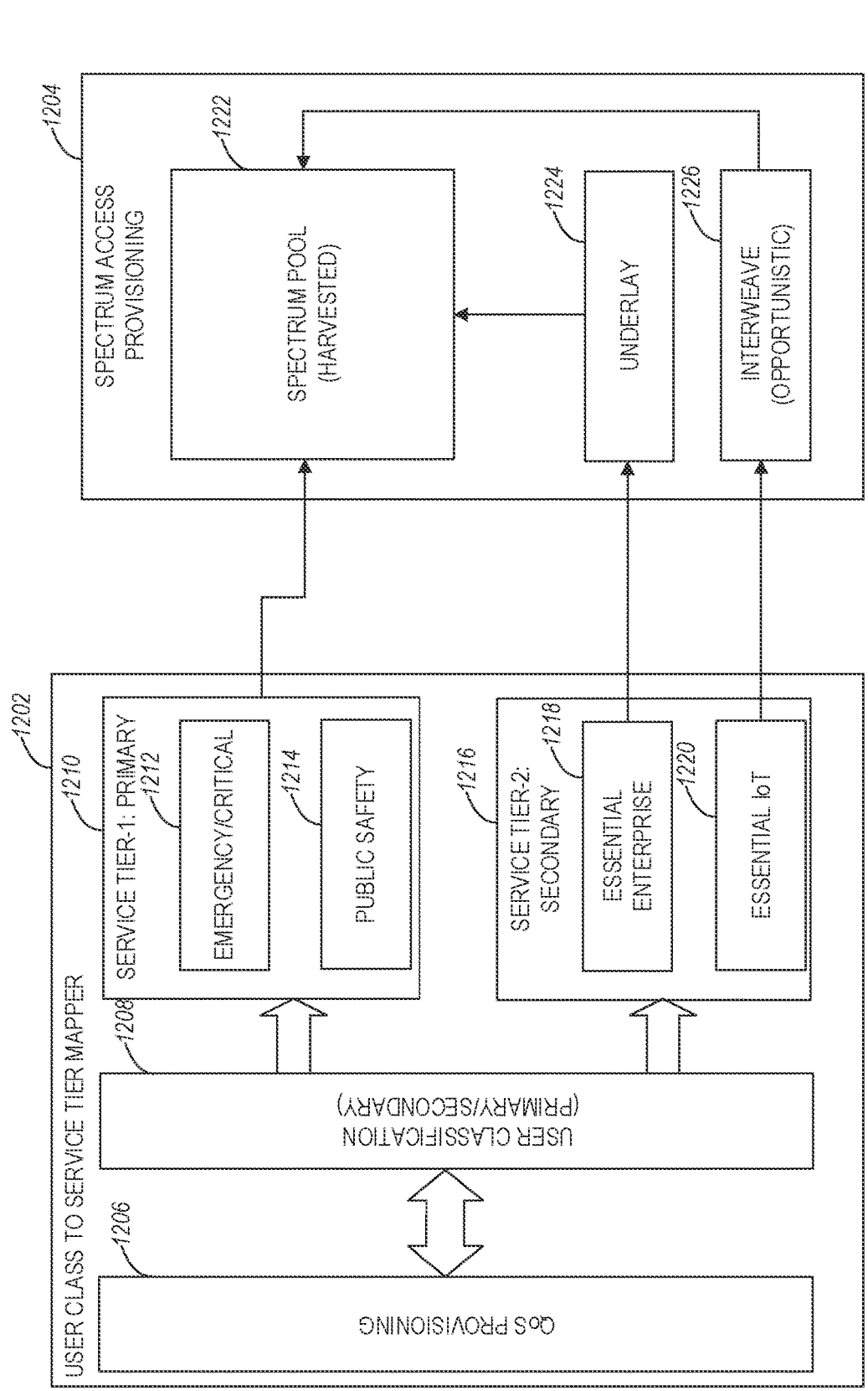
FIG. 12 illustrates spectrum sharing via tier-based user classification with underlay and interview access provisions enforcement for tier-2 users, according to some embodiments.

In some embodiments, the disclosed techniques may include harvested spectrum pool sharing as discussed herein in connection with FIG. 12.

FIG. 12 illustrates spectrum sharing 1200 via tier-based user classification with underlay and interview access provisions enforcement for tier-2 users, according to some embodiments. Referring to FIG. 12, user class to service tier mapper 1202 may include a QoS provisioning module 1206, a user classification module 1208, a primary tier 1210, and a secondary tier 1216. The primary tier may include emergency/critical services 1212 and public safety-related services 1214. The secondary tier may include essential enterprise businesses 1218 and essential IoT devices 1220. The spectrum sharing 1200 is further associated with spectrum access provisioning 1204, which may include interweave 1226, underlay 1224, and a spectrum pool 1222.

In the example embodiment of FIG. 12, an example spectrum sharing paradigm can be controlled/enforced by the Spectrum Broker/Coordinator service level agreements (SLAs)/service level objectives (SLOs) delegated to the MNOs and their harvesters for maintaining compliance. The proposed paradigm enables the coexistence of the end-users during the FAFO events. Thus, these paradigms may be considered at the harvester (Level-1), MNO (Level-2), collaborative inter-MNO (Level-3) operations. In some embodiments, spectrum sharing based on tiered service architecture for access management/provisioning of the common pool of harvested spectrum may be configured as shown in FIG. 12. The following methods/mechanisms may be used in connection with spectrum sharing 1200:

(a) The services may be divided into two Tiers, Tier-1 1210 as the primary users (PUs) or high priority users of the harvested spectrum, and Tier-2 1216 as the secondary users (SUs) or low priority users of the harvested spectrum. As shown in FIG. 12, Emergency/Critical services 1212 (including first responders, defense/military, et al.) and Public Safety related services 1214 fall under Service Tier-1, whereas essential enterprise/businesses 1218 (home and business utility operators) and essential IoT devices 1220 (such as smart Thermostat, security cameras, weather/temperature sensors, etc.) fall under Service Tier-2.

(b) Depending on the service requested, all users may be categorized into two classes: Primary and Secondary users where primary users (PUs) are mapped to service Tier-1 and secondary users (SUs) are mapped to service Tier-2 considering the QoS requirements as well. The QoS provisioning module 1206 communicates with the user classification module 1208 and their association result in user class is mapped to a service tier. Such mapping may not necessarily be static (may change dynamically). As earlier framed herein above, the SLO can become in the form of spectrum allocation or used other techniques such as dynamic 5G slicing.

(c) In provisioning the harvested spectrum pool access for SUs, two schemes for the SUs to share the spectrum with the PUs may be used: {Underlay, Interleave}. Such schemes may apply to Tier-2/Secondary users since Tier-1/Primary users are treated as the incumbents of the harvested spectrum pool. The schemes are defined as follows:

(c.1) For the underlay scheme, the SUs may operate within the non-harmful interference limits to the primary users, which can be possible via spread-spectrum techniques.

(c.2) For interweave scheme, either (i) the SUs need to sense the PUs occupancy in the channels/sub-channels of interest and can access the channel only if they can sense the channel as empty/idle with the required (per SBA's requirement specified agreement with MNOs) confidence (that is, COO); or (ii) alternatively (or additionally), time-division access may be used to avoid interference among UEs that may interfere in frequency may also be enforced by the MNOs for interweave operation.

Figure 13:
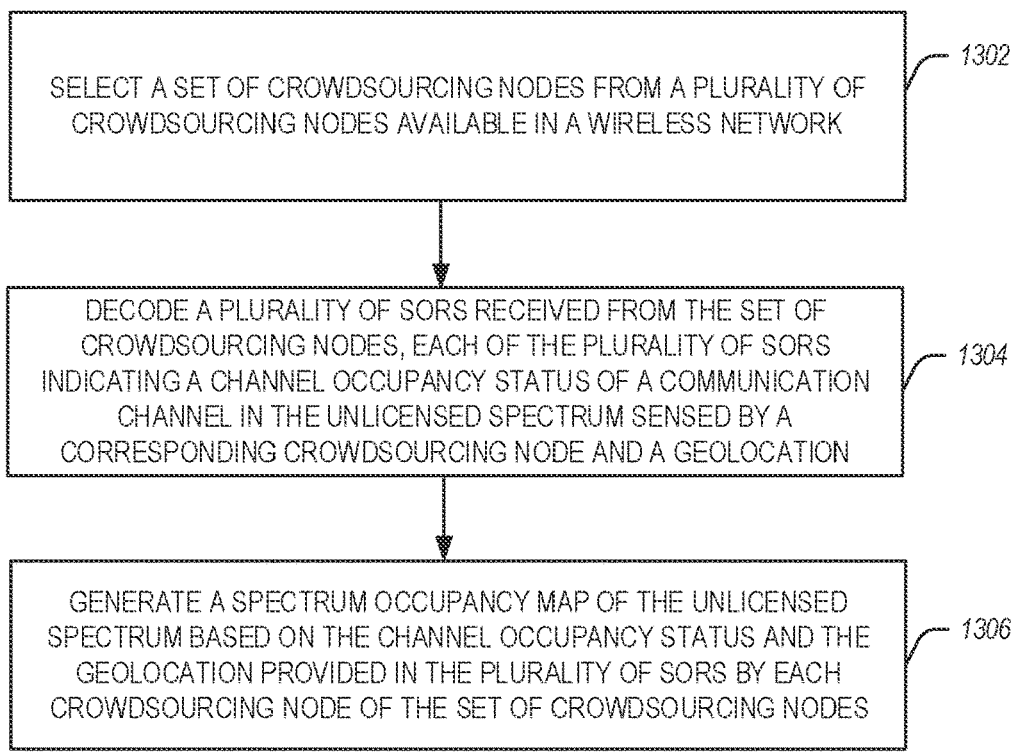
FIG. 13 illustrates a flowchart of a method for spectrum harvesting, according to an example embodiment.

FIG. 13 illustrates a flowchart of a method 1300 for spectrum harvesting in a wireless network, according to an example embodiment. Method 1300 may be performed by a computing node (e.g., node 900 or node 950) performing the disclosed spectrum harvesting functions (e.g., SHF 111 and as discussed in connection with FIGS. 10-12).

At operation 1302, a set of crowdsourcing nodes is selected from a plurality of crowdsourcing nodes available in the wireless network. For example and about FIG. 10, the harvester selects the set of crowdsourcing nodes illustrated in diagram 1002.

At operation 1304, a plurality of spectrum occupancy reports (SORs) received from the set of crowdsourcing nodes are decoded by the harvester (e.g., as illustrated in diagram 1004 in FIG. 10). Each SOR of the plurality of SORs indicates a channel occupancy status of a communication channel in the unlicensed spectrum sensed by a corresponding crowdsourcing node of the set and geolocation associated with the corresponding crowdsourcing node.

At operation 1306, a spectrum occupancy map (e.g., map 1007 in FIG. 10) of the unlicensed spectrum is generated based on the channel occupancy status and the geolocation provided in the plurality of SORs by each crowdsourcing node of the set of crowdsourcing nodes.

It should be understood that the functional units or capabilities described in this specification may have been referred to or labeled as components, circuits, or modules, to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing node to implement a spectrum harvesting entity in a wireless network configured for crowdsource-based unlicensed spectrum harvesting, the node comprising: interface circuitry; and processing circuitry coupled to the interface circuitry, the processing circuitry configured to: select a set of crowdsourcing nodes from a plurality of crowdsourcing nodes available in the wireless network; decode a plurality of spectrum occupancy reports (SORs) received from the set of crowdsourcing nodes via the interface circuitry, each SOR of the plurality of SORs indicating a channel occupancy status of a communication channel in the unlicensed spectrum sensed by a corresponding crowdsourcing node of the set and a geolocation associated with the corresponding crowdsourcing node; and generate a spectrum occupancy map of the unlicensed spectrum based on the channel occupancy status and the geolocation provided in the plurality of SORs by each crowdsourcing node of the set of crowdsourcing nodes.

In Example 2, the subject matter of Example 1 includes subject matter where the channel occupancy status indicates one of occupied status or unoccupied status for the communication channel, and wherein the processing circuitry is further configured to determine confidence of occupancy (COO) information associated with the communication channel based on each SOR of the plurality of SORs, the COO information including probability of detection the communication channel is in the occupied status.

In Example 3, the subject matter of Example 2 includes subject matter where the COO information further includes a probability of false alarm that the communication channel is in the occupied status or the unoccupied status when the channel is, in fact, unoccupied.

In Example 4, the subject matter of Example 3 includes subject matter where the spectrum occupancy map is a time-frequency grid for a plurality of geolocations associated with the set of crowdsourcing nodes, and wherein the processing circuitry is further configured to aggregate the plurality of SORs to generate the time-frequency grid, each section in the time-frequency grid indicating the occupied status or the unoccupied status and the COO information.

In Example 5, the subject matter of Example 4 includes subject matter where each SOR of the plurality of SORs further includes one or more of frequency band information; scanned bandwidth information; frequency/channel/subchannel information; device identification of the corresponding crowdsourcing node; and at least one transceiver configuration parameter of the corresponding crowdsourcing node.

In Example 6, the subject matter of Examples 1-5 includes subject matter where the channel occupancy status of the communication channel in the unlicensed spectrum is based on reinforcement learning (RL)-based crowdsourced spectrum sensing.

In Example 7, the subject matter of Example 6 includes subject matter where the RL-based crowdsourced spectrum sensing is based on Q-learning channel status estimation of the communication channel in the unlicensed spectrum.

In Example 8, the subject matter of Examples 2-7 includes subject matter where to select the set of crowdsourcing nodes from the plurality of crowdsourcing nodes, the processing circuitry is configured to determine the plurality of crowdsourcing nodes based on one or more operating parameters indicative of node power status; and encode a request for a SOR for transmission to each of the plurality of crowdsourcing nodes via the interface circuitry.

In Example 9, the subject matter of Example 8 includes subject matter where to select the set of crowdsourcing nodes from the plurality of crowdsourcing nodes, the processing circuitry is configured to decode a SOR received via the interface circuitry from each of the plurality of crowdsourcing nodes; perform ranking of the plurality of crowdsourcing nodes based on the COO information associated with the SOR received from each of the plurality of crowdsourcing nodes; and select the set of crowdsourcing nodes from the plurality of crowdsourcing nodes based on the ranking.

In Example 10, the subject matter of Examples 1-9 includes subject matter where the processing circuitry is configured to encode the spectrum occupancy map of the unlicensed spectrum for transmission to a crowdsourcing management entity of a mobile network operator (MNO) for inclusion into an MNO-aggregated spectrum occupancy map.

Example 11 is at least one non-transitory machine-readable storage medium comprising instructions stored thereupon, which when executed by processing circuitry of a computing node operable to implement a spectrum harvesting entity in a wireless network configured for crowdsource-based unlicensed spectrum harvesting, cause the processing circuitry to perform operations comprising: selecting a set of crowdsourcing nodes from a plurality of crowdsourcing nodes available in the wireless network; decoding a plurality of spectrum occupancy reports (SORs) received from the set of crowdsourcing nodes, each SOR of the plurality of SORs indicating a channel occupancy status of a communication channel in the unlicensed spectrum sensed by a corresponding crowdsourcing node of the set and a geolocation associated with the corresponding crowdsourcing node; and generating a spectrum occupancy map of the unlicensed spectrum based on the channel occupancy status and the geolocation provided in the plurality of SORs by each crowdsourcing node of the set of crowdsourcing nodes.

In Example 12, the subject matter of Example 11 includes subject matter where the channel occupancy status indicates one of occupied status or unoccupied status for the communication channel, and wherein the operations further comprise: determining confidence of occupancy (COO) information associated with the communication channel based on each SOR of the plurality of SORs, the COO information including probability of detection the communication channel is in the occupied status and probability of false alarm that the communication channel is in the occupied status when the channel is, in fact, unoccupied.

In Example 13, the subject matter of Example 12 includes subject matter where the spectrum occupancy map is a time-frequency grid for a plurality of geolocations associated with the set of crowdsourcing nodes, and wherein the operations further comprise: aggregating the plurality of SORs to generate the time-frequency grid, each section in the time-frequency grid indicating the occupied status or the unoccupied status and the COO information.

In Example 14, the subject matter of Examples 11-13 includes subject matter where the channel occupancy status of the communication channel in the unlicensed spectrum is based on reinforcement learning (RL)-based crowdsourced spectrum sensing, and wherein the RL-based crowdsourced spectrum sensing is based on Q-learning channel status estimation of the communication channel in the unlicensed spectrum.

In Example 15, the subject matter of Examples 12-14 includes subject matter where the operations for selecting the set of crowdsourcing nodes from the plurality of crowdsourcing nodes further comprise: determining the plurality of crowdsourcing nodes based on one or more operating parameters indicative of node power status; and encoding a request for a SOR for transmission to each of the plurality of crowdsourcing nodes.

In Example 16, the subject matter of Example 15 includes subject matter where the operations for selecting the set of crowdsourcing nodes from the plurality of crowdsourcing nodes further comprise: decoding a SOR received from each of the plurality of crowdsourcing nodes; performing ranking of the plurality of crowdsourcing nodes based on the COO information associated with the SOR received from each of the plurality of crowdsourcing nodes; and selecting the set of crowdsourcing nodes from the plurality of crowdsourcing nodes based on the ranking.

In Example 17, the subject matter of Examples 11-16 includes subject matter where the operations further comprise: encoding the spectrum occupancy map of the unlicensed spectrum for transmission to a crowdsourcing management entity of a mobile network operator (MNO) for inclusion into an MNO-aggregated spectrum occupancy map.

Example 18 is a computing node to implement a crowdsourcing entity in a wireless network configured for crowdsource-based unlicensed spectrum harvesting, the node comprising: interface circuitry; and processing circuitry coupled to the interface circuitry, the processing circuitry configured to: decode a request for a spectrum occupancy report (SOR) received via the interface circuitry from a spectrum harvesting entity in the wireless network; determine a channel occupancy status of a communication channel in the unlicensed spectrum, the channel occupancy status indicating one of occupied status or unoccupied status for the communication channel; determine confidence of occupancy (COO) information associated with the communication channel, the COO information including probability of detection the communication channel is in the occupied status; and encode the SOR for transmission to the spectrum harvesting entity via the interface circuitry, the SOR indicating the channel occupancy status, the COO information, and a geolocation associated with the computing node.

In Example 19, the subject matter of Example 18 includes subject matter where the COO information further includes a probability of false alarm that the communication channel is in the occupied status when the channel is, in fact, unoccupied.

In Example 20, the subject matter of Examples 18-19 includes subject matter where the processing circuitry is configured to: apply reinforcement learning (RL)-based processing to select the communication channel from a plurality of available communication channels in the unlicensed spectrum and to determine the channel occupancy status; and Wherein the RL-based processing uses Q-learning channel status estimation of the communication channel.

Example 21 is an edge computing system, comprising a plurality of edge computing nodes, the plurality of edge computing nodes configured with the biometric security methods of any of the examples 1-20.

Example 22 is an edge computing node, operable in an edge computing system, comprising processing circuitry configured to implement any of the examples 1-20.

Example 23 is an edge computing node, operable as a server in an edge computing system, configured to perform any of the examples 1-20.

Example 24 is an edge computing node, operable as a client in an edge computing system, configured to perform any of the examples 1-20.

Example 25 is an edge computing node, operable in a layer of an edge computing network as an aggregation node, network hub node, gateway node, or core data processing node, configured to perform any of the examples 1-20.

Example 26 is an edge computing network, comprising networking and processing components configured to provide or operate a communications network, to enable an edge computing system to implement any of the examples 1-20.

Example 27 is an access point, comprising networking and processing components configured to provide or operate a communications network, to enable an edge computing system to implement any of the examples 1-20.

Example 28 is a base station, comprising networking and processing components configured to provide or operate a communications network, to enable an edge computing system to implement any of the examples 1-20.

Example 29 is a roadside unit, comprising networking components configured to provide or operate a communications network, to enable an edge computing system to implement any of the examples 1-20.

Example 30 is an on-premise server, operable in a private communications network distinct from a public edge computing network, the server configured to enable an edge computing system to implement any of the examples 1-20.

Example 31 is a 3GPP 4G/LTE mobile wireless communications system, comprising networking and processing components configured with the biometric security methods of any of the examples 1-20.

Example 32 is a 5G network mobile wireless communications system, comprising networking and processing components configured with the biometric security methods of any of the examples 1-20.

Example 33 is a user equipment device, comprising networking and processing circuitry, configured to connect with an edge computing system configured to implement any of the examples 1-20.

Example 34 is a client computing device, comprising processing circuitry, configured to coordinate compute operations with an edge computing system, the edge computing system is configured to implement any of the examples 1-20.

Example 35 is an edge provisioning node, operable in an edge computing system, configured to implement any of the examples 1-20.

Example 36 is a service orchestration node, operable in an edge computing system, configured to implement any of the examples 1-20.

Example 37 is an application orchestration node, operable in an edge computing system, configured to implement any of the examples 1-20.

Example 38 is a multi-tenant management node, operable in an edge computing system, configured to implement any of the examples 1-20.

Example 39 is an edge computing system comprising processing circuitry, the edge computing system configured to operate one or more functions and services to implement any of the examples 1-20.

Example 40 is networking hardware with network functions implemented thereupon, operable within an edge computing system configured with the biometric security methods of any of examples 1-20.

Example 41 is acceleration hardware with acceleration functions implemented thereupon, operable in an edge computing system, the acceleration functions configured to implement any of the examples 1-20.

Example 42 is storage hardware with storage capabilities implemented thereupon, operable in an edge computing system, the storage hardware configured to implement any of the examples 1-20.

Example 43 is computation hardware with compute capabilities implemented thereupon, operable in an edge computing system, the computation hardware configured to implement any of the examples 1-20.

Example 44 is an edge computing system adapted for supporting vehicle-to-vehicle (V2V), vehicle-to-everything (V2X), or vehicle-to-infrastructure (V2I) scenarios, configured to implement any of the examples 1-20.

Example 45 is an edge computing system adapted for operating according to one or more European Telecommunications Standards Institute (ETSI) Multi-Access Edge Computing (MEC) specifications, the edge computing system configured to implement any of the examples 1-20.

Example 46 is an edge computing system adapted for operating one or more multi-access edge computing (MEC) components, the MEC components provided from one or more of: a MEC proxy, a MEC application orchestrator, a MEC application, a MEC platform, or a MEC service, according to a European Telecommunications Standards Institute (ETSI) Multi-Access Edge Computing (MEC) configuration, the MEC components configured to implement any of the examples 1-20.

Example 47 is an edge computing system configured as an edge mesh, provided with a microservice cluster, a microservice cluster with sidecars, or linked microservice clusters with sidecars, configured to implement any of the examples 1-20.

Example 48 is an edge computing system, comprising circuitry configured to implement one or more isolation environments provided among dedicated hardware, virtual machines, containers, virtual machines on containers, configured to implement any of the examples 1-20.

Example 49 is an edge computing server, configured for operation as an enterprise server, roadside server, street cabinet server, or telecommunications server, configured to implement any of the examples 1-20.

Example 50 is an edge computing system configured to implement any of the examples 1-20 with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, interact of things operations, object detection, speech recognition, healthcare applications, gaming applications, or accelerated content processing.

Example 51 is an edge computing system, comprising computing nodes operated by multiple owners at different geographic locations, configured to implement any of the examples 1-20.

Example 52 is a cloud computing system, comprising data servers operating respective cloud services, the respective cloud services configured to coordinate with an edge computing system to implement any of the examples 1-20.

Example 53 is a server, comprising hardware to operate cloudlet, edgelet, or applet services, the services configured to coordinate with an edge computing system to implement any of the examples 1-20.

Example 54 is an edge node in an edge computing system, comprising one or more devices with at least one processor and memory to implement any of the examples 1-20.

Example 55 is an edge node in an edge computing system, the edge node operating one or more services provided from among a management console service, a telemetry service, a provisioning service, an application or service orchestration service, a virtual machine service, a container service, a function deployment service, or a compute deployment service, or an acceleration management service, the one or more services configured to implement any of the examples 1-20.

Example 56 is a set of distributed edge nodes, distributed among a network layer of an edge computing system, the network layer comprising a close edge, local edge, enterprise edge, on-premise edge, near edge, middle, edge, or far edge network layer, configured to implement any of the examples 1-20.

Example 57 is an apparatus of an edge computing system comprising: one or more processors and one or more computer-readable media comprising instructions that, when executed by the one or more processors, cause the one or more processors to perform any of the examples 1-20.

Example 58 is one or more computer-readable storage media comprising instructions to cause an electronic device of an edge computing system, upon execution of the instructions by one or more processors of the electronic device, to perform any of the examples 1-20.

Example 59 is a communication signal communicated in an edge computing system, to perform any of the examples 1-20.

Example 60 is a data structure communicated in an edge computing system, the data structure comprising a datagram, packet, frame, segment, protocol data unit (PDU), or message, to perform any of the examples 1-20.

Example 61 is a signal communicated in an edge computing system, the signal encoded with a datagram, packet, frame, segment, protocol data unit (PDU), message, or data to perform any of the examples 1-20.

Example 62 is an electromagnetic signal communicated in an edge computing system, the electromagnetic signal carrying computer-readable instructions, wherein execution of the computer-readable instructions by one or more processors causes the one or more processors to perform any of the examples 1-20.

Example 63 is a computer program used in an edge computing system, the computer program comprising instructions, wherein execution of the program by a processing element in the edge computing system is to cause the processing element to perform any of the examples 1-20.

Example 64 is an apparatus of an edge computing system comprising means to perform any of the examples 1-20.

Example 65 is an apparatus of an edge computing system comprising logic, modules, or circuitry to perform any of the examples 1-20.

Example 66 is at least one machine-readable medium including instructions that, when executed by processing circuitry, cause the processing circuitry to perform operations to implement any of Examples 21-65.

Example 67 is an apparatus comprising means to implement any of Examples 21-65.

Example 68 is a system to implement any of Examples 21-65.

Example 69 is a method to implement any of Examples 21-65.

Although these implementations have been described with reference to specific exemplary aspects, it will be evident that various modifications and changes may be made to these aspects without departing from the broader scope of the present disclosure. Many of the arrangements and processes described herein can be used in combination or parallel implementations to provide greater bandwidth/ throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A computing node to implement a spectrum harvesting entity in a wireless network configured for crowdsource-based unlicensed spectrum harvesting, the node comprising:
   interface circuitry; and
   processing circuitry coupled to the interface circuitry, the processing circuitry configured to:
      select a set of crowdsourcing nodes from a plurality of crowdsourcing nodes available in the wireless network;
      decode a plurality of spectrum occupancy reports (SORs) received from the set of crowdsourcing nodes via the interface circuitry, each SOR of the plurality of SORs indicating a channel occupancy status of a communication channel in the unlicensed spectrum sensed by a corresponding crowdsourcing node of the set and geolocation associated with the corresponding crowdsourcing node; and generate a spectrum occupancy map of the unlicensed spectrum based on the channel occupancy status and the geolocation provided in the plurality of SORs by each crowdsourcing node of the set of crowdsourcing nodes.

2. The computing node of claim 1, wherein the channel occupancy status indicates one of occupied status or unoccupied status for the communication channel, and wherein the processing circuitry is further configured to:

determine confidence of occupancy (COO) information associated with the communication channel based on each SOR of the plurality of SORs, the COO information including probability of detection the communication channel is in the occupied status.

3. The computing node of claim 2, wherein the COO information further includes a probability of false alarm that the communication channel is in the occupied status when the channel is unoccupied.

4. The computing node of claim 3, wherein the spectrum occupancy map is a time-frequency grid for a plurality of geolocations associated with the set of crowdsourcing nodes, and wherein the processing circuitry is further configured to:

aggregate the plurality of SORs to generate the time-frequency grid, each section in the time-frequency grid indicating the occupied status or the unoccupied status and the COO information.

5. The computing node of claim 4, wherein each SOR of the plurality of SORs further includes one or more of:
frequency band information;
scanned bandwidth information;
frequency/channel/sub-channel information;
device identification of the corresponding crowdsourcing node; and
at least one transceiver configuration parameter of the corresponding crowdsourcing node.

6. The computing node of claim 2, wherein to select the set of crowdsourcing nodes from the plurality of crowdsourcing nodes, the processing circuitry is configured to:

determine the plurality of crowdsourcing nodes based on one or more operating parameters indicative of node power status; and encode a request for a SOR for transmission to each of the plurality of crowdsourcing nodes via the interface circuitry.

7. The computing node of claim 6, wherein to select the set of crowdsourcing nodes from the plurality of crowdsourcing nodes, the processing circuitry is configured to:

decode a SOR received via the interface circuitry from each of the plurality of crowdsourcing nodes;

perform ranking of the plurality of crowdsourcing nodes based on the COO information associated with the SOR received from each of the plurality of crowdsourcing nodes; and select the set of crowdsourcing nodes from the plurality of crowdsourcing nodes based on the ranking.

8. The computing node of claim 1, wherein the channel occupancy status of the communication channel in the unlicensed spectrum is based on reinforcement learning (RL)-based crowdsourced spectrum sensing.

9. The computing node of claim 8, wherein the RL-based crowdsourced spectrum sensing is based on Q-learning channel status estimation of the communication channel in the unlicensed spectrum.

10. The computing node of claim 1, wherein the processing circuitry is configured to:

encode the spectrum occupancy map of the unlicensed spectrum for transmission to a crowdsourcing management entity of a mobile network operator (MNO) for inclusion into an MNO-aggregated spectrum occupancy map.

11. At least one non-transitory machine-readable storage medium comprising instructions stored thereupon, which when executed by processing circuitry of a computing node operable to implement a spectrum harvesting entity in a wireless network configured for crowdsource-based unlicensed spectrum harvesting, cause the processing circuitry to perform operations comprising:

selecting a set of crowdsourcing nodes from a plurality of crowdsourcing nodes available in the wireless network;

decoding a plurality of spectrum occupancy reports (SORs) received from the set of crowdsourcing nodes, each SOR of the plurality of SORs indicating a channel occupancy status of a communication channel in the unlicensed spectrum sensed by a corresponding crowdsourcing node of the set and geolocation associated with the corresponding crowdsourcing node; and generating a spectrum occupancy map of the unlicensed spectrum based on the channel occupancy status and the geolocation provided in the plurality of SORs by each crowdsourcing node of the set of crowdsourcing nodes.

12. The at least one non-transitory machine-readable storage medium of claim 11, wherein the channel occupancy status indicates one of occupied status or unoccupied status for the communication channel, and wherein the operations further comprise:

determining confidence of occupancy (COO) information associated with the communication channel based on each SOR of the plurality of SORs, the COO information including probability of detection the communication channel is in the occupied status and probability of false alarm that the communication channel is in the occupied status when the channel is unoccupied.

13. The at least one non-transitory machine-readable storage medium of claim 12, wherein the spectrum occupancy map is a time-frequency grid for a plurality of geolocations associated with the set of crowdsourcing nodes, and wherein the operations further comprise:

aggregating the plurality of SORs to generate the time-frequency grid, each section in the time-frequency grid indicating the occupied status or the unoccupied status, and the COO information.

14. The at least one non-transitory machine-readable storage medium of claim 12, wherein the operations for selecting the set of crowdsourcing nodes from the plurality of crowdsourcing nodes further comprise:

determining the plurality of crowdsourcing nodes based on one or more operating parameters indicative of node power status; and encoding a request for a SOR for transmission to each of the plurality of crowdsourcing nodes.

15. The at least one non-transitory machine-readable storage medium of claim 14, wherein the operations for selecting the set of crowdsourcing nodes from the plurality of crowdsourcing nodes further comprise:

decoding a SOR received from each of the plurality of crowdsourcing nodes;

performing ranking of the plurality of crowdsourcing nodes based on the COO information associated with the SOR received from each of the plurality of crowdsourcing nodes; and selecting the set of crowdsourcing nodes from the plurality of crowdsourcing nodes based on the ranking.

16. The at least one non-transitory machine-readable storage medium of claim 11, wherein the channel occupancy status of the communication channel in the unlicensed spectrum is based on reinforcement learning (RL)-based crowdsourced spectrum sensing, and wherein the RL-based crowdsourced spectrum sensing is based on Q-learning channel status estimation of the communication channel in the unlicensed spectrum.

17. The at least one non-transitory machine-readable storage medium of claim 11, wherein the operations further comprise:

encoding the spectrum occupancy map of the unlicensed spectrum for transmission to a crowdsourcing management entity of a mobile network operator (MNO) for inclusion into an MNO-aggregated spectrum occupancy map.

18. A computing node to implement a crowdsourcing entity in a wireless network configured for crowdsource-based unlicensed spectrum harvesting, the node comprising:

interface circuitry; and processing circuitry coupled to the interface circuitry, the processing circuitry configured to:

decode a request for a spectrum occupancy report (SOR) received via the interface circuitry from a spectrum harvesting entity in the wireless network;

determine a channel occupancy status of a communication channel in the unlicensed spectrum, the channel occupancy status indicating one of occupied status or unoccupied status for the communication channel;

determine confidence of occupancy (COO) information associated with the communication channel, the COO information including probability of detection the communication channel is in the occupied status; and encode the SOR for transmission to the spectrum harvesting entity via the interface circuitry, the SOR indicating the channel occupancy status, the COO information, and geolocation associated with the computing node.

19. The computing node of claim 18, wherein the COO information further includes a probability of false alarm that the communication channel is in the occupied status when the channel is unoccupied.

20. The computing node of claim 18, wherein the processing circuitry is configured to:

apply reinforcement learning (RL)-based processing to select the communication channel from a plurality of available communication channels in the unlicensed spectrum and to determine the channel occupancy status; and wherein the RL-based processing uses Q-learning channel status estimation of the communication channel.

* * * * *